:

US006219770B1

(12) United States Patent
Landau

(10) Patent No.: US 6,219,770 B1
(45) Date of Patent: Apr. 17, 2001

(54) METHOD AND APPARATUS FOR MANAGING COPY ON WRITE OPERATIONS IN A VIRTUAL MEMORY

(75) Inventor: Charles Robert Landau, Santa Clara, CA (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 09/046,943

(22) Filed: Mar. 23, 1998

(51) Int. Cl.[7] .................................................. G06F 12/00
(52) U.S. Cl. ............................... 711/162; 711/161; 711/6; 711/165
(58) Field of Search .................................... 711/162, 165, 711/202, 203; 707/204, 205, 206, 101, 203; 713/202

(56) References Cited

U.S. PATENT DOCUMENTS

| 4,918,653 | * | 4/1990 | Johri et al. ............................ 713/202 |
| 5,202,994 | * | 4/1993 | Begur et al. .......................... 711/202 |
| 5,465,365 | * | 11/1995 | Winterbottom ....................... 707/101 |
| 5,473,777 | * | 12/1995 | Moeller et al. ....................... 709/302 |
| 5,619,696 | * | 4/1997 | Nakagawa ............................ 709/100 |
| 5,666,514 | * | 9/1997 | Cheriton .............................. 711/144 |
| 5,729,710 | * | 3/1998 | Magee et al. ........................ 711/203 |
| 5,843,226 | * | 11/1998 | Barton et al. ........................ 711/203 |
| 5,893,117 | * | 4/1999 | Wang ................................... 707/203 |
| 5,893,155 | * | 4/1999 | Cheriton .............................. 711/144 |

OTHER PUBLICATIONS

Park et al., Torjan: A High–Performance Simulator for Shared Memory Architectures, 1996, pp. 44–53.*
Branstad et al., Assurance for the Trusted Mach Operating System, 1989, pp. 103–108.*
Costa, COWL: Copy–On–Write for Logic Programs, 1999, pp. 720–727.*
Brustoloni et al., Copy Emulation in Checksummed, Multiple–Packet Communication, 1997, pp. 1122–1130.*
Banahan et al., The Unix Book, 1983, pp. 108–111.*
Goodheart et al., The Magic Garden Explained, 1994, pp. 91, 93, 105–107, 115–117, 177,252, 253.*

(List continued on next page.)

*Primary Examiner*—John W. Cabeca
*Assistant Examiner*—Brian R. Peugh
(74) *Attorney, Agent, or Firm*—Fenwick & West

(57) ABSTRACT

A method and apparatus operating within an object-oriented virtual memory management system. In the virtual memory management system, each page is referenced by traversing a series of mapping tables. Each mapping table is associated with one of a plurality of Partitioned Memory Objects (PMOs). Each PMO includes a plurality of MORs (Memory Object References). PMOs and NSKMPage data structures are collectively referred to as memory objects. When a memory object is duplicated (also called a "copy on write" or a "virtual copy"), the actual copy of the duplicated memory object is deferred until a write to the memory object actually occurs. MORs have a VCState field, which can have values of VCOriginal, VCDuplicate, VCSubdupFull, or VCSubdupPart. During a copy on write operation, a VCState of a MOR referring to the duplicated memory object is set to "VCDuplicate" and set to point to the memory object that was copied. The VCState of MORs referring to memory within the copied memory are set to "subduplicate (which can be either VCSubdupFull or VCSubdupPart)." During subsequent copy operations, MORs having a VCState of either VCDuplicate of VCSubdupFull do not need to be visited again, since their VCState field has already been set. MORs having a VCState of VCSubdupPart, however, still need to be visited during subsequent write operations.

19 Claims, 19 Drawing Sheets

Example of VCSubDuplicate Full

OTHER PUBLICATIONS

Norman Hardy, "KayKOS Architecture," Operating Systems Review, vol. 19, n. 4, Oct. 1985, pp. 8–25.

Document entitled "A Programmer's Introduction to EROS," URL:http://www.cis.upenn,edu/~eros/devel/intro/Progrmrintro.html, 14 pages total. (publication date unknown).

Norman Hardy, "The KeyKOS Architecture," Eighth Edition (Dec. 1990), Copyright © Key Logic, eight pages total.

Richard Rashid, Avadis Tevanian, Michael Young, David Golub, Robert Baron, David Black, William Bolosky and Jonathan Chew, "Machine–Independent Virtual Memory Management for Paged Uniprocessor and Multiprocessor Architectures," Department of Computer Science, Carnegie Mellon University, Pittsburgh, Pennsylvania 15213 $2^{nd}$ Symposium on Architectural Support for Programming Languages and Operating Systems, ACM Oct., 1987, eight pages total.

* cited by examiner

Object-Oriented Virtual Memory Scheme

FIG. 3 Object-Oriented Virtual Memory Scheme (Details)

Format of PMOs and MORs

Format of NSKMPage Data Structure

Format of Mapping Table

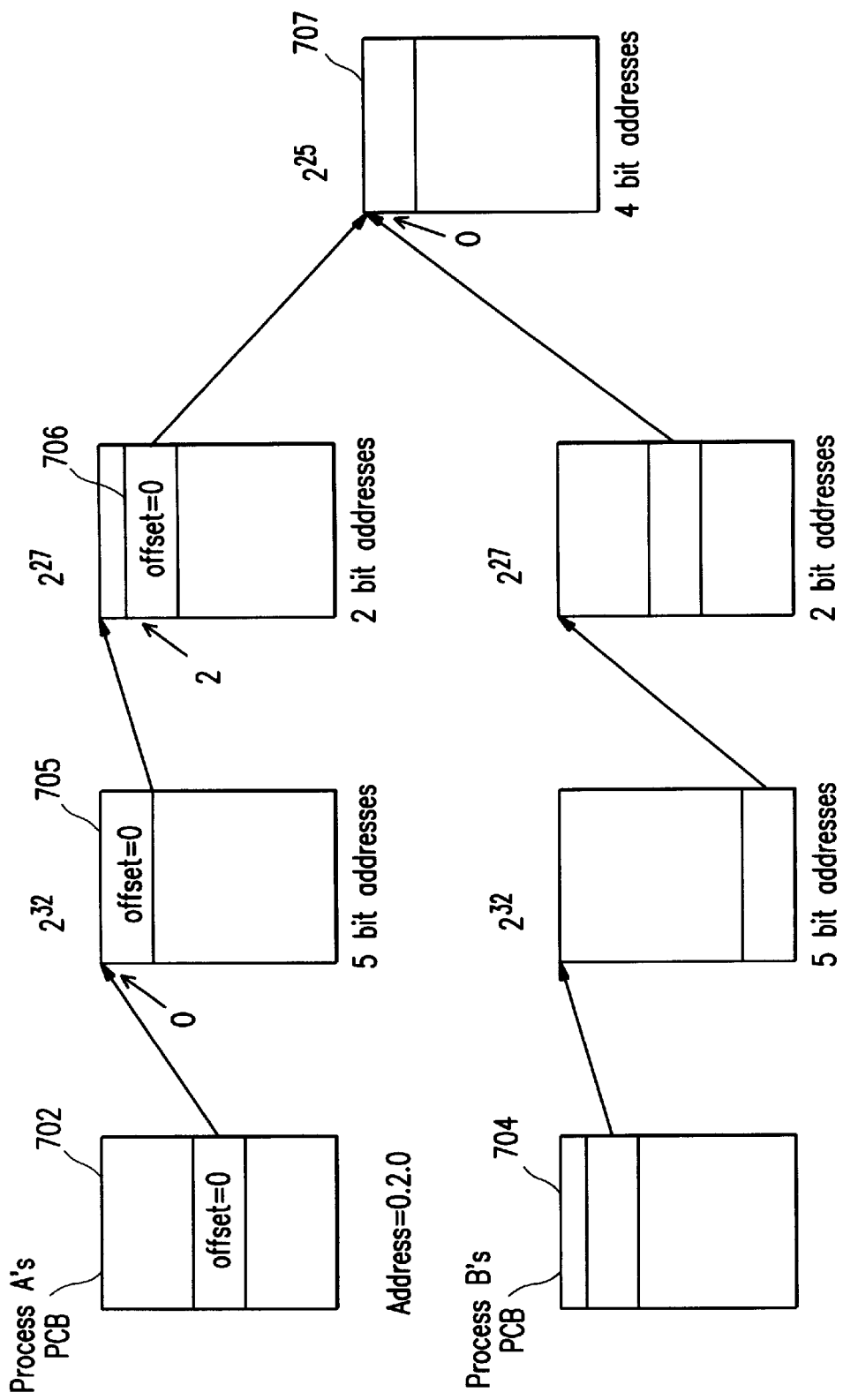
FIG. 7(a) Processes sharing memory

Processes Sharing Memory
(including an Uplevel Reference)

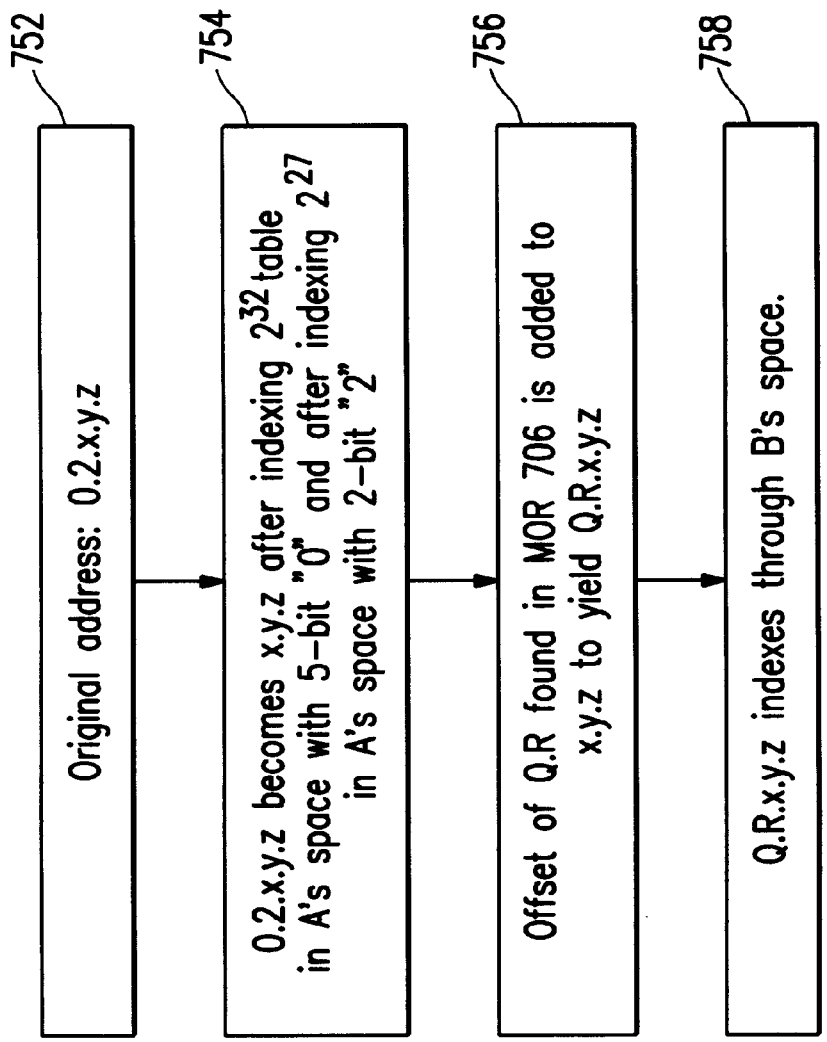
FIG. 7(c) Addressing An Uplevel Reference

Copying a memory space

FIG. 9 Marking Subduplicates of a Memory Object

Example of VCSubDuplicate Full

Example of VCSubDupPart

Duplicate MOR will not point to an Uplevel Reference

FIG. 13 Handling a Write to a New Copy of a Duplicate Page

Handling a Write to the Original of a Duplicated Object P

METHOD AND APPARATUS FOR MANAGING COPY ON WRITE OPERATIONS IN A VIRTUAL MEMORY

RELATED APPLICATIONS

This invention is related to the following application, which is herein incorporated by reference:
1) U.S. application Ser. No. U.S. Provisional Ser. No. 60/093,064, entitled Method and Apparatus for Managing Invalidation of Virtual Memory Mapping Table Entries, of Landau, filed, concurrently herewith on Mar. 23, 1998, which has expired.

BACKGROUND OF THE INVENTION

The present invention relates generally to memory management in a computer system and, specifically, to a memory management system for a computer system having multiple levels of virtual memory mapping tables.

Many types of general purpose computers and data processing systems contain memory that is organized using a "virtual memory" scheme. In general virtual memory allows applications and/or processes that are executing in the computer to behave as if they have an unlimited amount of memory at their disposal. In actuality, the amount of memory available to a particular application or process is limited by the amount of memory in the data processing system and further limited by the number of concurrently executing programs sharing that memory. In addition, a virtual memory scheme hides the actual physical address of memory from the application programs. Application programs access their memory space using a logical address, which is then converted to a physical address by the data processing system.

A virtual memory system organizes memory in units called "pages." These pages are moved between a fast, primary memory and one or more larger and usually slower secondary, tertiary, etc. memories. The movement of pages (often called "swapping") is transparent to the applications or processes that are executed in the data processing system, enabling the applications or processes to behave as if they each have an unlimited amount of memory.

Certain conventional systems occasionally need to copy portions of memory. This copy can either be user-initiated or initiated by the operating system. Conventional systems often use a "lazy" copy method in which the memory to be copied is assigned a status of read-only, but the actual copy is deferred until later. If an attempt is made to write into either the original or the copy, the memory is then copied at that time and both the original and the copy are given an I/O status of read-write. In this way, it appears that a copy was made immediately, but the actual copying is deferred until the last possible time. If no write is performed, no copying ever occurs. For this reason, this method is called "copy on write" or "virtual copy." This method is used, for example to implement the Unix and Posix "fork" operation, which copy the entire private memory of a process. Unix and Posix do not allow two processes to share memory that is subject to copy on write.

SUMMARY OF THE INVENTION

A preferred embodiment of the present invention operates within an object-oriented virtual memory management system. In the virtual memory management system, each page is referenced by traversing a series of mapping tables, which point to pages present in memory. Each mapping table is associated with one of a plurality of Partitioned Memory Objects (PMOs). Each PMO includes a plurality of Memory Object References (MORs). The lowest level PMOs point to NSKMPage data structures or BMOs (not shown). The NSKMPage data structures keep track of all pages in the physical memory. BMOs keep track of pages in the virtual memory that are not in physical memory. Both PMOs and NSKMPage data structures are collectively called "memory objects."

When a memory object is duplicated (also called a "copy on write" or a "virtual copy"), the actual copy of the duplicated memory is deferred until a write to the original or copy of the memory object actually occurs. Each MOR has a VCState field, which can have values of VCOriginal, VCDuplicate, VCSubdupFull, or VCSubdupPart.

During a copy on write operation, a VCState of a MOR (in a PMO) that refers to the duplicated memory object is set to "VCDuplicate." The MOR is set to point to the memory object that is being copied. The VCState of lower level MORs referring to memory within the copied memory are set to "subduplicate" (which can be either VCSubdupFull or VCSubdupPart). The I/O status of the chain of memory objects is set to ROVC (Read Only Virtual Copy), which indicates that a virtual copy of the memory has been performed. In a preferred embodiment, ROVC is indicated when a NumDupRefs field is zero.

The virtual memory management system allows "uplevel references," in which a memory object defining a first area of memory opens a "window" on a memory object having a second, larger area of memory. Such uplevel references receive special treatment during the copy on write operation. Only the subset of MORs in the second memory object's tree of memory objects that defines the window that is copied is marked subduplicate. Specifically, if all the memory defined by a MOR is in the window, the MOR is marked as VCSubdupFull. If only part of the memory defined by a MOR is in the window, the MOR is marked as VCSubdupPart.

The use of VCStates of VCSubdupPart and VCSubdupFull (which are collectively called "Subduplicate") improves the efficiency of the copy on write operation. If, after a first copy on write operation, a second copy on write operation occurs for a portion of memory that overlaps the already-copied memory, it is not necessary to traverse subtrees of MORs having a VCState of VCSubdupFull or VCDuplicate, since these have already been marked during the first copy on write operation. Skipping tree traversals makes it faster to mark the VCState of MORs during a copy on write operation. But, because the nature of uplevel references makes it undesirable to skip marking VCStates for uplevel references, subtrees with a VCState of VCSubdupPart are still traversed and marked during subsequent copy on write operations.

In accordance with the purpose of the invention, as embodied and broadly described herein, the invention relates to a method of implementing a copy on write operation, performed by a data processing system, comprising the steps of: receiving an instruction to implement a copy on write for a portion of memory, where the location of the portion of memory is described by a chain of memory objects having an initial memory object and at least one subsequent memory object; creating a copy of a Memory Object Reference (MOR) in the initial memory object; creating a pointer in the copy of the MOR to the memory being copied; marking the copy of the MOR as duplicated, while deferring the actual copying of the memory; and marking at least one MOR in the subsequent memory objects as a subduplicate.

BRIEF DESCRIPTION OF THE DRAWINGS

The accompanying drawings, that are incorporated in and constitute a part of this specification, illustrate several embodiments of the invention and, together with the description, serve to explain the principles of the invention.

FIG. 7(a) is a diagram illustrating a first process sharing the memory space of a second process.

FIG. 7(c) is a flow chart explaining how a preferred embodiment of the present invention handles an uplevel reference.

DETAILED DESCRIPTION OF PREFERRED EMBODIMENTS

Reference will now be made in detail to preferred embodiments of the invention, examples of which are illustrated in the accompanying drawings. Wherever practicable, the same reference numbers will be used throughout the drawings to refer to the same or like parts.

I. General Background

Figure 1:
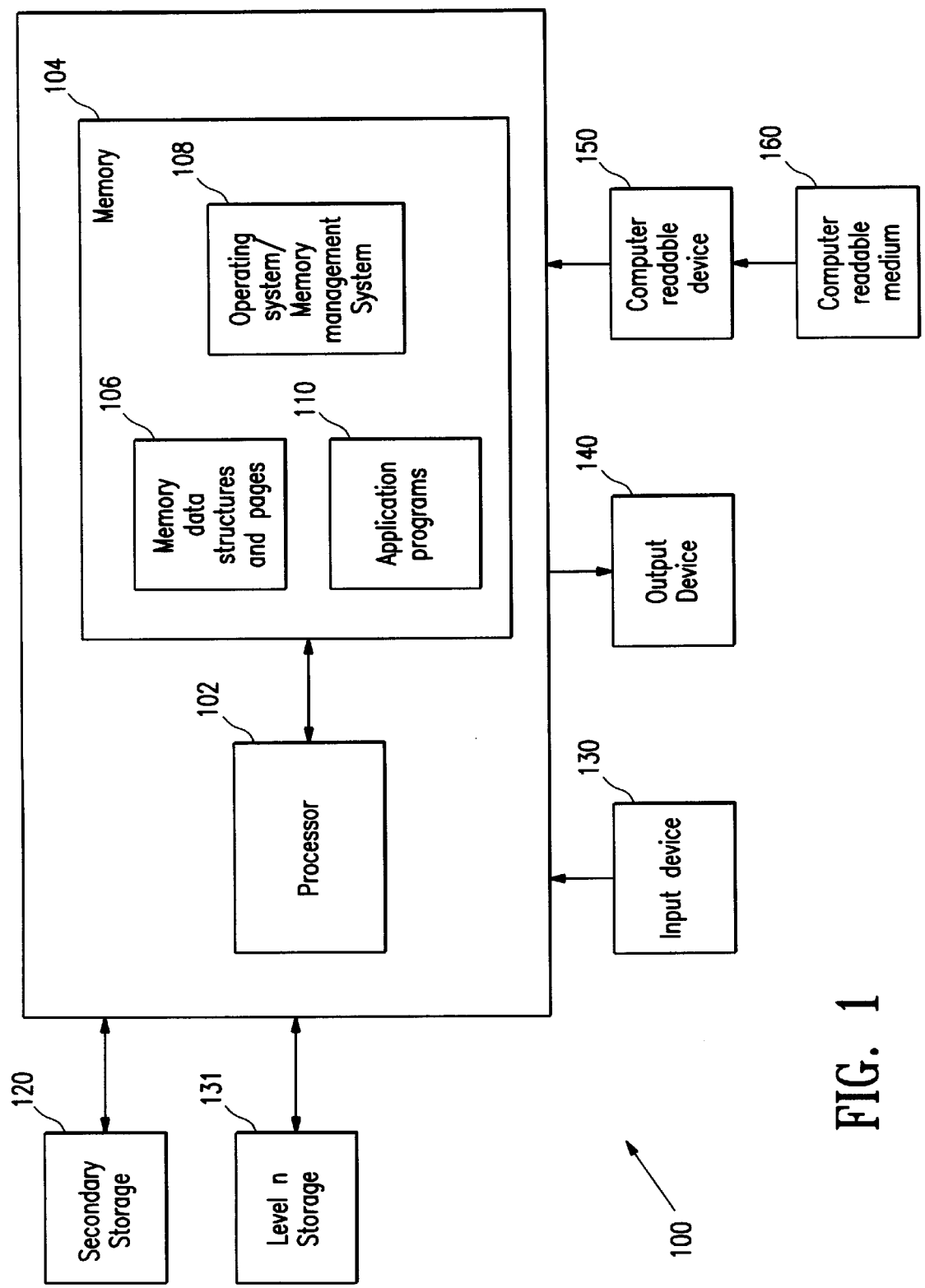
FIG. 1 is a block diagram of a data processing system in accordance with a preferred embodiment of the present invention.

FIG. 1 is a block diagram of a data processing system 100 in accordance with a preferred embodiment of the present invention. In FIG. 1, data processing system 100 includes a processor 102 and a storage area 104 (such as a memory). Storage area 104 includes application software programs 110, memory data structures and pages 106, and an operating system 108 including a memory management system.

System 100 also includes additional storage, such as secondary storage 120 and level n storage 131. Secondary and level n storage 120, 131 preferably are larger, slower types of storage than storage 104. Storage 120, 131 are used to hold pages of memory that are not currently present in storage area 104 (i.e., pages that are "swapped out").

In a preferred embodiment of the present invention, operating system 108 is the Tandem Non-Stop operating system, release G05, available from Tandem Computers, Inc. of Cupertino, Calif.

System 100 includes an input device 130, such as a keyboard, a touchpad, or a mouse that receives input from a user or other appropriate source. System 100 also includes an output device 140, such as a display screen, a printer, etc. that outputs information to the user or other appropriate destination.

A person of ordinary skill in the art will understand that system 100 may also contain additional information, such as input/output lines; input devices, such as a keyboard, a mouse, and a voice input device; and display devices, such as a display terminal. System 100 may also may include application programs, operating systems, data, etc., which are not shown in the figure for the sake of clarity. It also will be understood that system 100 can also include numerous elements not shown, such as disk drives, keyboards, display devices, network connections, additional memory, additional CPUs, additional processors, LANs, input/output lines, etc.

In the following discussion, it will be understood that the steps of methods and flow charts discussed preferably are performed by processor 102 (or another appropriate processor) executing instructions stored in storage area 104 (or other appropriate memories). Specifically, the steps described herein are performed by operating system/memory management system 108 and are transparent to application programs 110. It will also be understood that the invention is not limited to any particular implementation or programming technique and that the invention may be implemented using any appropriate techniques for implementing the functionality described herein. The invention is not limited to any particular programming language or operating system.

Some or all of the instructions and data structures in memory 104 may be read into memory from a computer-readable medium 160. Execution of sequences of instructions contained in memory 104 causes processor 102 to perform the process steps described herein. In alternative embodiments, hard-wired circuitry may be used in place of or in combination with software instructions to implement the invention. Thus, preferred embodiments of the invention are not limited to any specific combination of hardware circuitry and software.

System 100 can also include an input device 150, which reads computer readable medium 160. The term "computer-readable medium" as used herein refers to any medium that participates in providing instructions to a processor for execution. Such a medium may take many forms, including but not limited to, non-volatile media, volatile media, and transmission media. Non-volatile media includes, for example, optical or magnetic disks, such as a storage device. Volatile media includes dynamic memory. Transmission media include coaxial cables, copper wire and fiber optics, including the wires that comprise a bus within a computer. Transmission media can also take the form of acoustic or light waves, such as those generated during radio-wave and infra-red data communications.

Common forms of computer-readable media include, for example a floppy disk, a flexible disk, a hard disk, magnetic tape, or any other magnetic medium, a CD-ROM, any other optical medium, punchcards, papertapes, any other physical medium with patterns of holes, a RAM, a PROM, an EPROM, a FLASH-EPROM, any other memory chip or cartridge, a carrier wave as described hereafter, or any other medium from which a computer can read.

Various forms of computer readable media may be involved in carrying one or more sequences of one or more instructions to a processor for execution. For example, the instructions of operating system 108 may initially be carried on a magnetic disk or a tape. The instructions are loaded into memory 104. Alternately, instructions can be sent over a telephone line using a modem. A modem local to the computer system can receive the data on the telephone line and use an infra-red transmitter to convert the data to an infra-red signal. An infra-red detector coupled to a bus can receive the data carried in the infra-red signal and place the data on the bus. The bus carries data to main memory, from which a processor retrieves and executes the instructions. The instructions received by main memory may optionally be stored on a storage device either before or after execution by a processor.

II. An Object-Oriented Virtual Memory System

Figure 2:
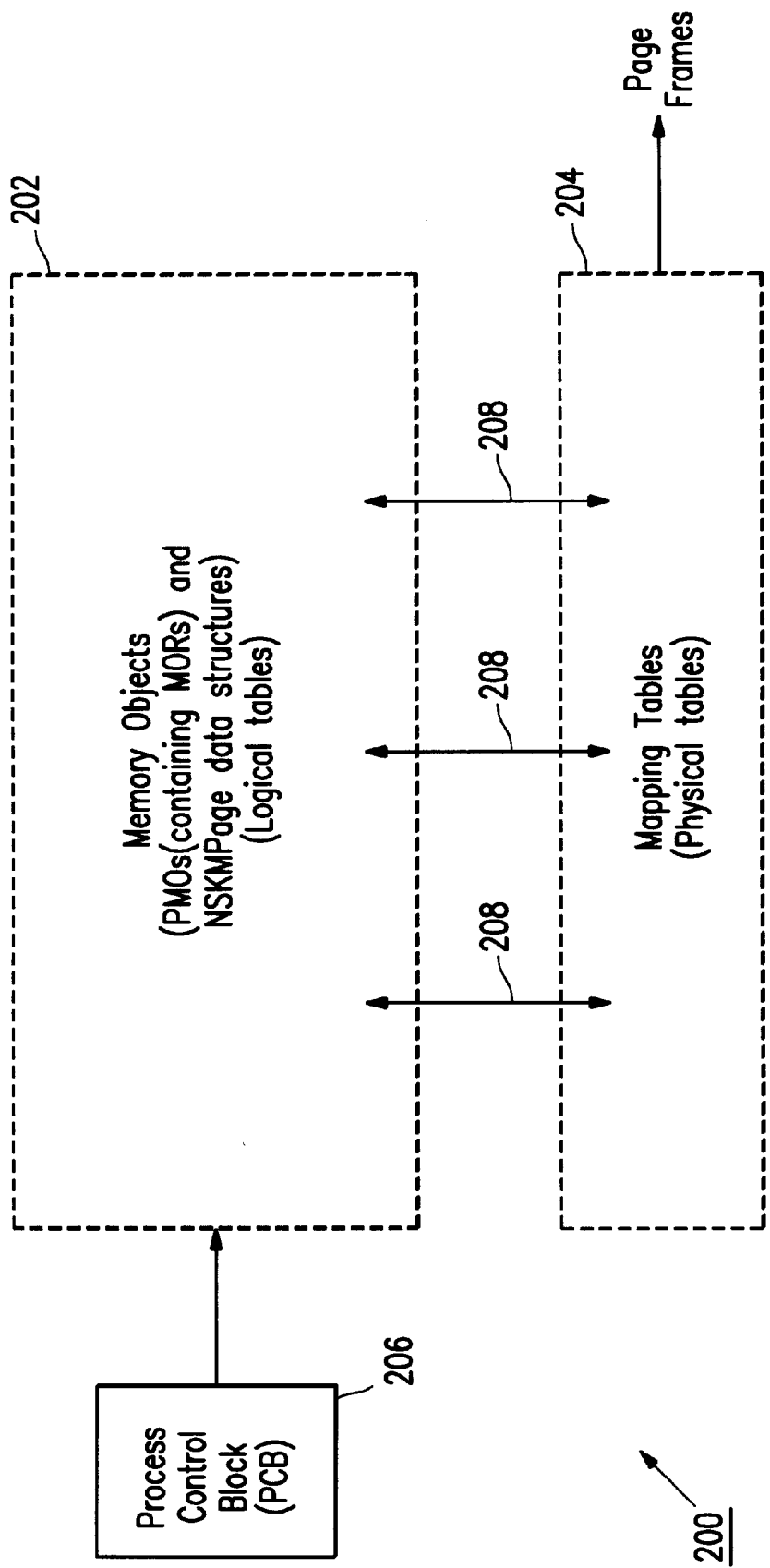
FIG. 2 is a diagram of data structures in an object-oriented virtual memory.
Figure 3:
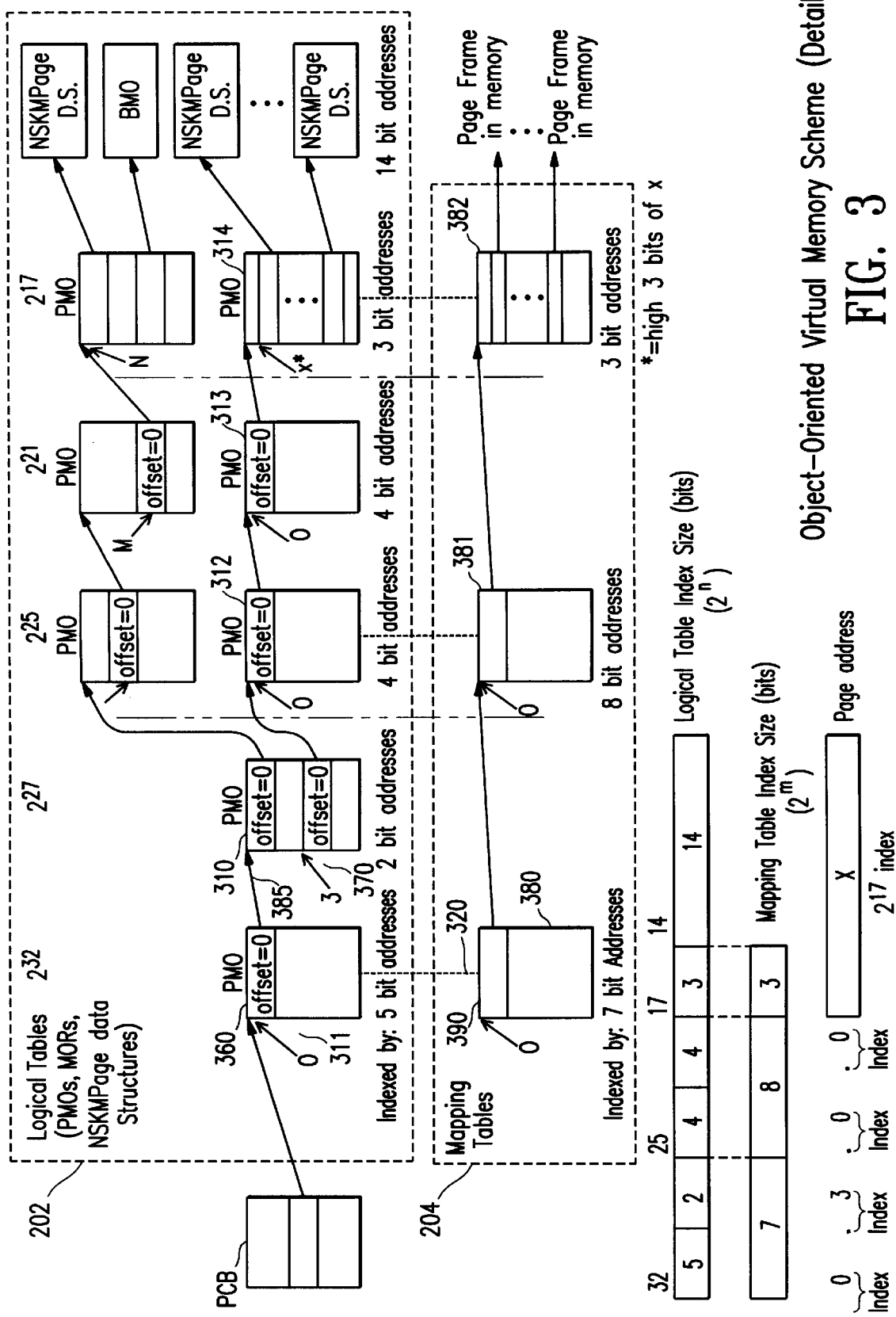
FIG. 3 is a diagram showing details of an example of logical and physical data structures in the object-oriented virtual memory of FIG. 2.

FIG. 2 is a diagram of data structures in an object-oriented virtual memory 200 in accordance with a preferred embodiment of the present invention. Only a portion of the virtual memory is shown. The object-oriented virtual memory 200 includes a PCB (Process Control Block) 206 that indicates a group of logical tables 202 for a process and a group of physical tables 204 for the process. Logical tables 202 map all the pages that are logically present in the address space of the process, whether the pages are swapped in or out. As will be described below in detail, logical tables 202 include PMOs (Partitioned Memory Objects) (which include MORs (Memory Object References)), NSKMPage data structures, and Basic Memory Objects (BMOs) as shown in FIG. 3. The physical tables 204 include mapping tables, which map locations for those pages that are physically present (i.e., that are swapped into memory 104). Each mapping table is associated with a PMO, as indicated by arrows 208.

The general concept of virtual memory is described, for example, in Patterson and Hennessy, "Computer Architecture, A Quantitative Approach," 2nd Edition, Morgan Kaufman, January 1996, which is herein incorporated by reference.

Figure 4:
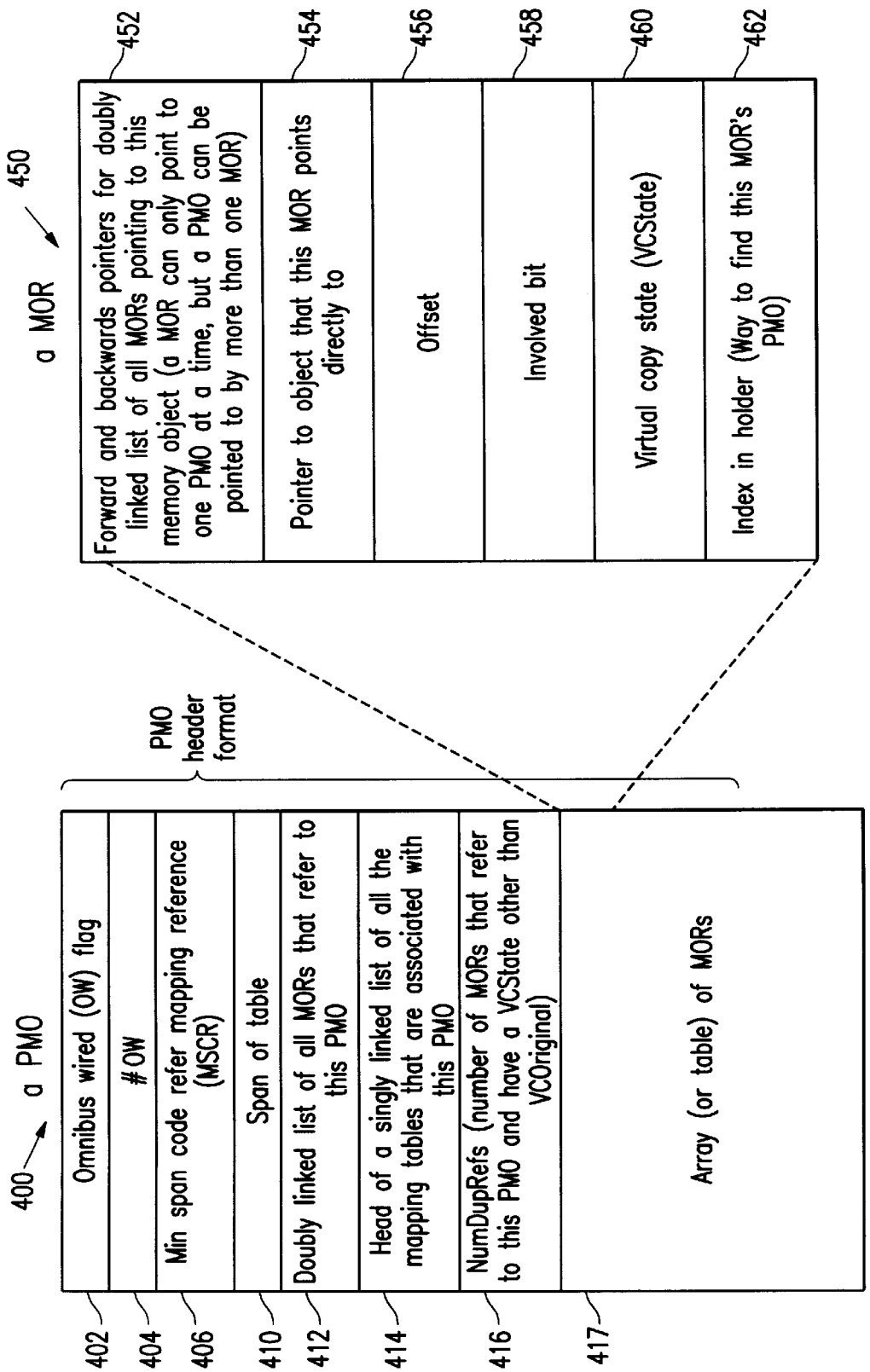
FIG. 4 is a diagram showing an exemplary format of a Partitioned Memory Object (PMO) data structure and an Memory Object Reference (MOR) data structure of FIG. 3.
Figure 5:
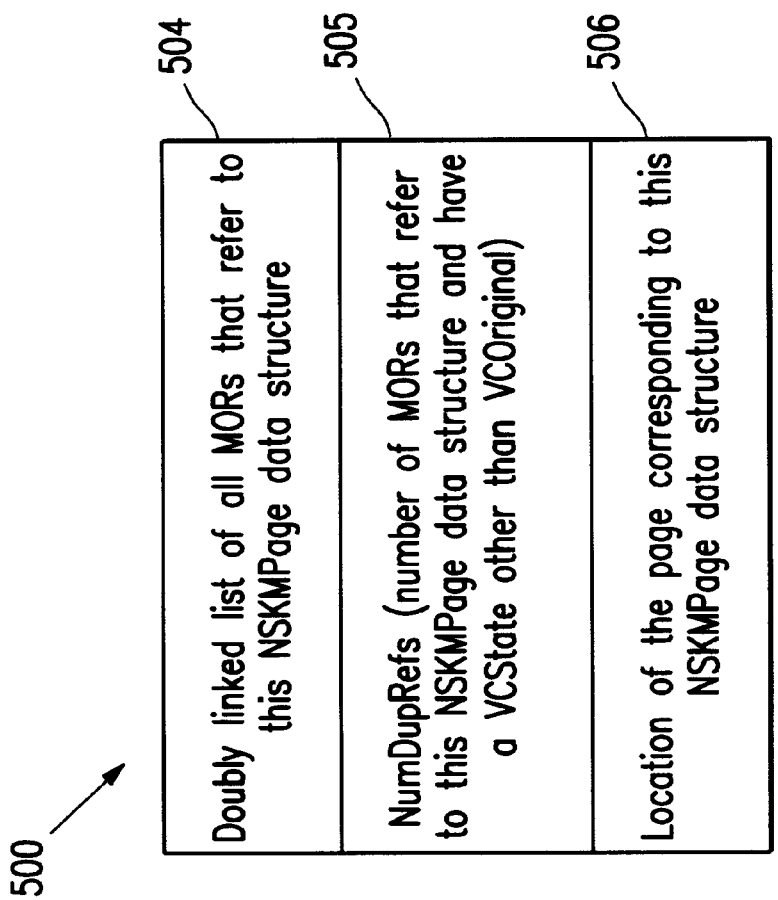
FIG. 5 is a diagram showing an exemplary format of an NSKMPage data structure of FIG. 3.
Figure 6:
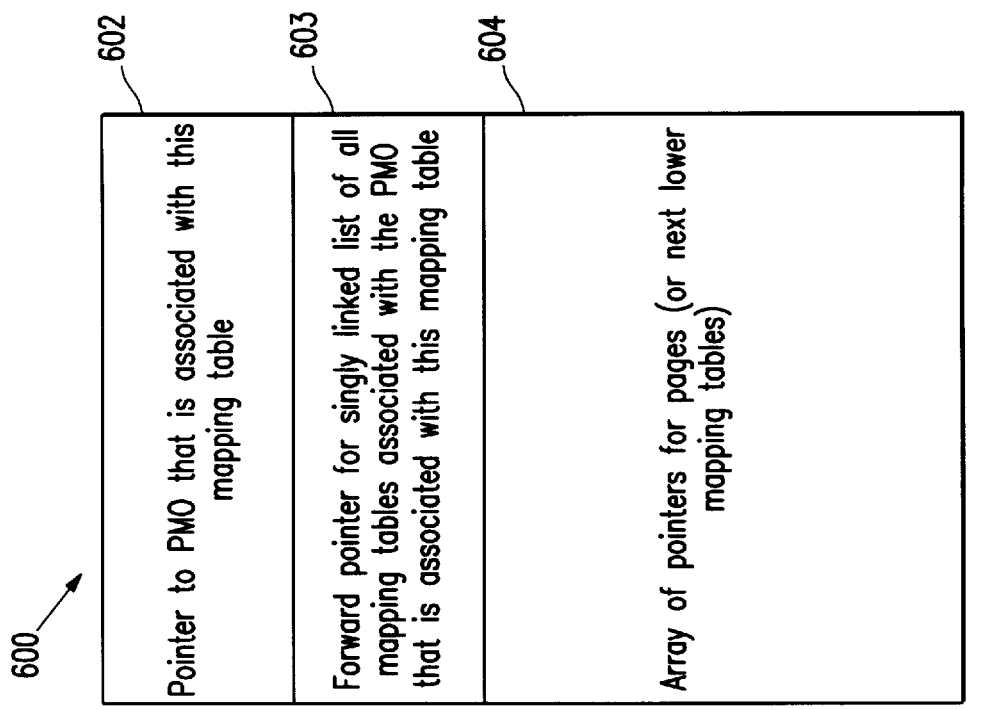
FIG. 6 is a diagram showing an exemplary format of a mapping table data structure of FIG. 3.

FIG. 3 is a diagram showing details of an example of logical and physical tables in the object-oriented virtual memory of FIG. 2. Details of exemplary formats of tables 202 and 204 are shown in FIGS. 4–6. It should be appreciated that the specific number of bits, number of levels, names of data structures, and so on, in FIG. 3 are provided for the sake of example and are not to be taken as a limitation of the invention. Similarly, although the tables are shown to be approximately the same size (vertically and horizontally), all the tables need not be the same size.

In the example of FIG. 3, both the logical tables 202 and the mapping tables 204 describe a full $2^{32}$ address space. However, mapping tables 204 only indicate whether a particular page is swapped in or out (and the location of the page if it is swapped in). In contrast, logical tables 202 indicate a location for every page in the $2^{32}$ address space. Each mapping table has a two-way "association" with a corresponding PMO in the logical tables. A PMO can be associated with one or more mapping tables. A mapping table can only be associated with one PMO.

Each PMO and each mapping table defines a certain number of addresses. This number is called a "span." For example, FIG. 3 shows an example in which a page having a virtual address of "0.3.0.0." is referenced. The notation "0.3.0.0.x" indicates successive portions of a memory address. The dots (".") separate portions of the address and the numerals indicate portions of the address, which can be varying numbers of bits long. In the example of FIG. 3, the first "0" portion of the address indexes PMO 360 and is five bits long. The "3" portion of the address indexes PMO 310 and is two bits long. The second "0" portion of the address indexes PMO 312 and is four bits long. The third "0" portion of the address indexes PMO 313 and is four bits long. The "X" portion of the address is seventeen bits long. In the example, each page is addressable by a thirty-two bit address. The number of address bits used to index each PMO 360, 310, 312, 313, and 314 is, respectively, 5, 2, 4, 4, and 3 bits. Thus, the number of MORs in each PMO is, respectively, $2^5$, $2^2$, $2^4$, $2^4$, and $2^3$ and the spans of the PMOs are, respectively, $2^{32}$, $2^{27}$, $2^{25}$, $2^{21}$, and $2^{17}$. The span of an entry/MOR in, for example PMO 360, (which itself has a span of $2^{32}$) is $2^{27}$ because each MOR in PMO 160 references a PMO of size $2^{27}$ The number of address bits used to index each mapping table 380, 381, 382 is, respectively, 7, 8, and 3. Thus, the number of entries in each mapping table is, respectively, $2^7$, $2^8$, and $2^3$. The spans of the mapping tables are, respectively, $2^{32}$, $2^{25}$, and $2^{17}$.

An exemplary MOR 311 in PMO 360 is indexed by the first "0" portion of the address and contains a pointer to a PMO 310. The pointer to the PMO 310 is indicated in FIG. 3 by arrow 385. PMO 310 is indexed by the "3" portion of the address. MOR 311 contains an offset of "0," which is used to alter the index into the PMO under certain circumstances, as described below in detail. Similarly, mapping table entry 390 in mapping table 380 points to mapping table 381. Mapping table entries in this implementation do not include offsets. Mapping table 380 is associated with PMO 360 as indicated by arrow 320.

FIG. 3 illustrates the multi-level nature of the mapping tables. In the example, the highest order mapping table 380 contains pointers to mapping tables of the next lower order, etc. The lowest order mapping table indicate the location of pages that are swapped in.

When an application program references a page, operating system 108 first attempts to locate the page in physical memory via the mapping tables. If a page is not present in memory, one or more of the mapping tables will contain a "null" value to indicate that the page (or a memory space including the page) is not present. Thus, if a page fault occurs when accessing a page through the mapping tables (i.e., if a null value is encountered in a mapping table while trying to access the page), the associated PMO can be referenced to determine the location of the swapped out page. The page can then be located and swapped into memory. At the time that a page is swapped into memory, the mapping table entries for the page also are filled in to indicate the page's location in memory.

For example, in FIG. 3, if the mapping table 380 has a null pointer for a desired page, it is possible to go directly to PMO 360, since it is associated with mapping table 380. The path beginning with PMO 360 can then be traversed to locate the needed page. It should be understood that every MOR and every mapping table entry contains a value, but only selected MORs and mapping table entries are shown in the Figures for the sake of clarity.

FIG. 4 is a diagram showing an exemplary format 400 of a PMO and an exemplary format 450 of a MOR of FIGS. 2 and 3. The PMO format 400 includes a header, which includes an omnibus wired (OW) flag 402; an Omnibus wired field 404; a min span code refer mapping reference (MSCR) field 406; a span 410 of the PMO, a doubly linked list 412 of all MORs that refer to this PMO; and the head of a singly linked list 414 of all the mapping tables that are associated with this PMO. The PMO also includes an array (or table) 417 of MORs that are in this PMO. In the described embodiment, the PMO has an I/O status of "ROVC" (read only virtual copy) if a number of MORs that refer to this PMO and have a VCState other than VCOriginal (i.e., NumDupRefs field 416) is non-zero.

Each MOR in a PMO has a format 450 shown in FIG. 4. The format 450 of each MOR includes forward and backwards pointers 452 for a doubly linked list of all MORs pointing to this memory object (a MOR can only point to one memory object at a time, but a memory object can be pointed to by more than one MOR). The MOR format 450 also includes a pointer 454 to an object that this MOR points directly to; an offset 456; an "involved bit" 458; a virtual copy state 460; and an index 462 of this MOR in the array 417 of the containing PMO. The index is a way to find this MOR's PMO.

FIG. 5 is a diagram showing an exemplary format 500 of an NSKMPage data structure in FIGS. 2 and 3. The term NSKMPage arises because the described embodiment is embodied in the Non-Stop Kernel (NSK) operating system, available from Tandem Computers of Cupertino Calif. Other non-Tandem nomenclature can, of course be used. In the example of FIG. 3, each NSKMPage represents 14 address bits. Thus, in the example, the span of each NSKMPage is $2^{14}$.

A NSKMPage data structure includes a doubly linked list 504 of all MORs that refer to this NSKMPage data structure. The NSKMPage data structure includes a field 505 that contains the number of MORs that refer to this NSKMPage data structure that are duplicates or subduplicates. The NSKMPage data structure also identifies a location 506 of the physical page corresponding to this NSKMPage data structure.

FIG. 6 is a diagram showing an exemplary format 600 of a mapping table of FIGS. 2 and 3. The mapping table format 600 includes a pointer 602 to the PMO that is associated with this mapping table. For example, PMO 360 is associated with mapping table 380 (as shown by dotted line 320 in FIG. 3). Note that not all PMOs are associated with a mapping table. The mapping table also includes a forward pointer for a singly linked list of all mapping tables associated with the PMO that is associated with this mapping table and an array of pointers 604 to next-lower-order mapping tables (or, for the lowest level mapping tables, to pages).

FIG. 7(a) is a diagram illustrating how processes can share memory. As shown in FIG. 7(a), MORs of a process A 702 can point to memory objects of a process B 704. Although not shown in FIG. 7(a), processes can also share mapping tables in a similar manner.

Figure 7B:
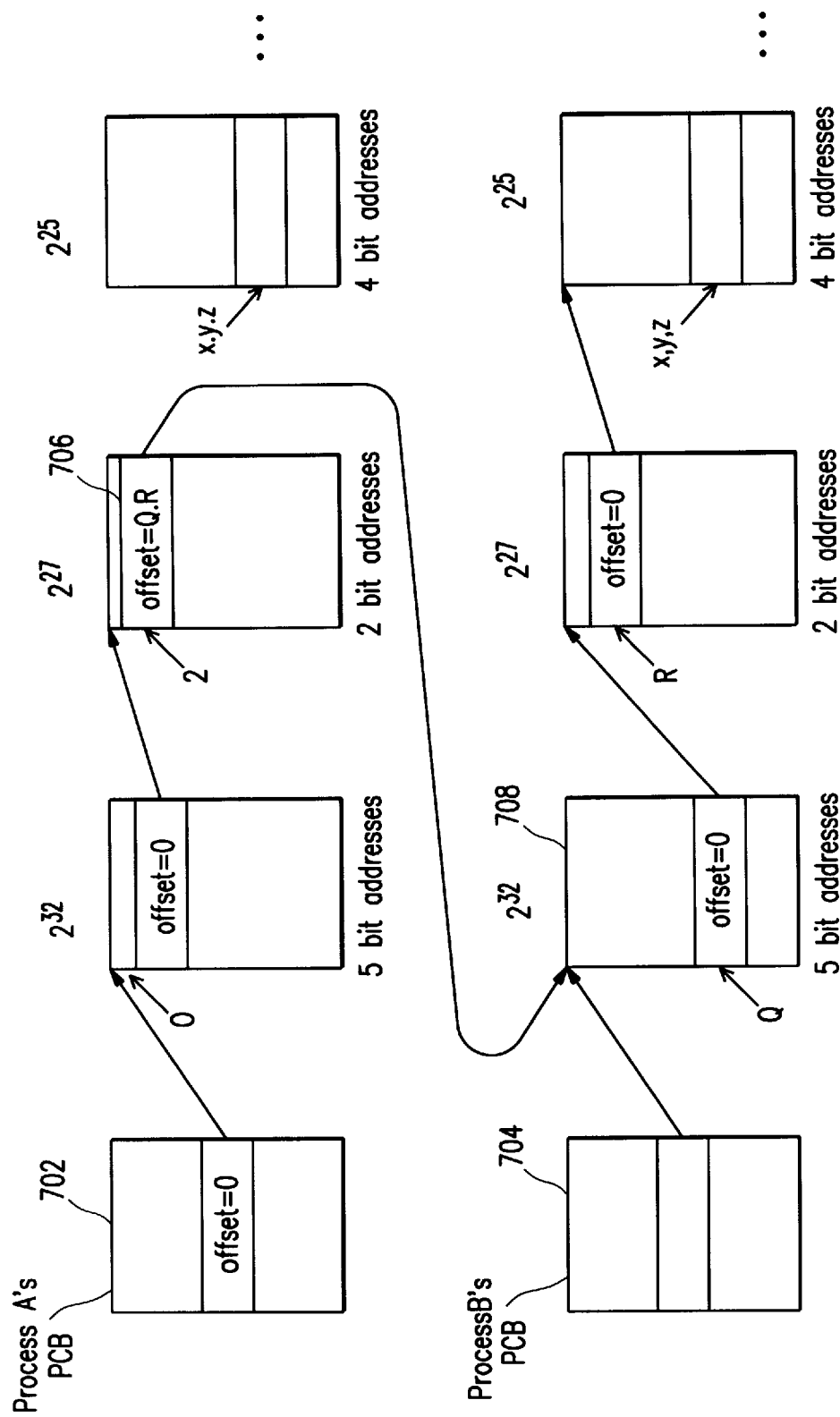
FIG. 7(b) is a diagram illustrating an example of an uplevel reference.

FIG. 7(b) is a diagram illustrating the concept of an "uplevel reference." In the example, the uplevel reference is a MOR 706, which normally refers to a first area of memory ($2^{25}$). MOR 706 opens a window on a second memory object 708 having a second, larger area of memory ($2^{32}$). Such uplevel references receive special treatment during the copy on write operation, as described below.

The situation of FIG. 7(b) might arise, for example, if process A 702 is a debugger computer program that is debugging process B 704. Since process A needs to look at process B's memory, process A maps a portion of the address space of process A onto the address space of process B. If MOR 706 is changed to point to PMO 708, then $2^{25}$ units of process B's address space is seen by process A. Any changes to B's address space are reflected in what A sees.

FIG. 7(c) is a flow chart showing an example of how addressing is handled for an uplevel reference. Step 752 shows that the original address is 0.2.x.y.z. Step 754 shows that 0.2.z.x.y. becomes x.y.z after indexing $2^{32}$ table in A's space with 5-bit "0" and after indexing $2^{27}$ table in A's space with 2-bit "2". Step 756 shows that the offset of Q.R found in MOR 706 is appended to x.y.z to yield Q.R.x.y.z. Step 758 shows that the address Q.R.x.y.z indexes through B's address space. Of course, the address Q.R.x.y.z can only address a part of B's address space of size $2^{25}$.

III. Copy on Write (Virtual Copy)

Figure 8:
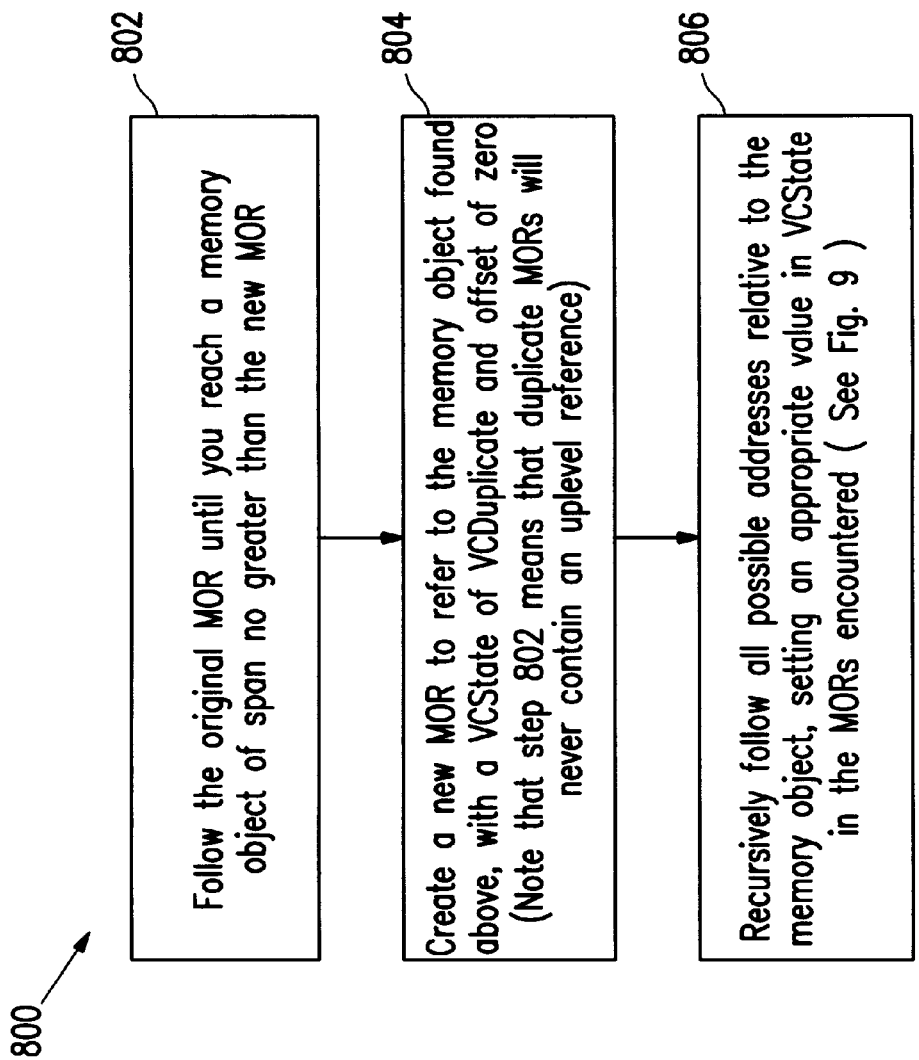
FIG. 8. is a flow chart showing an overview of steps performed by a preferred embodiment of the present invention to copy a page.
Figure 9:
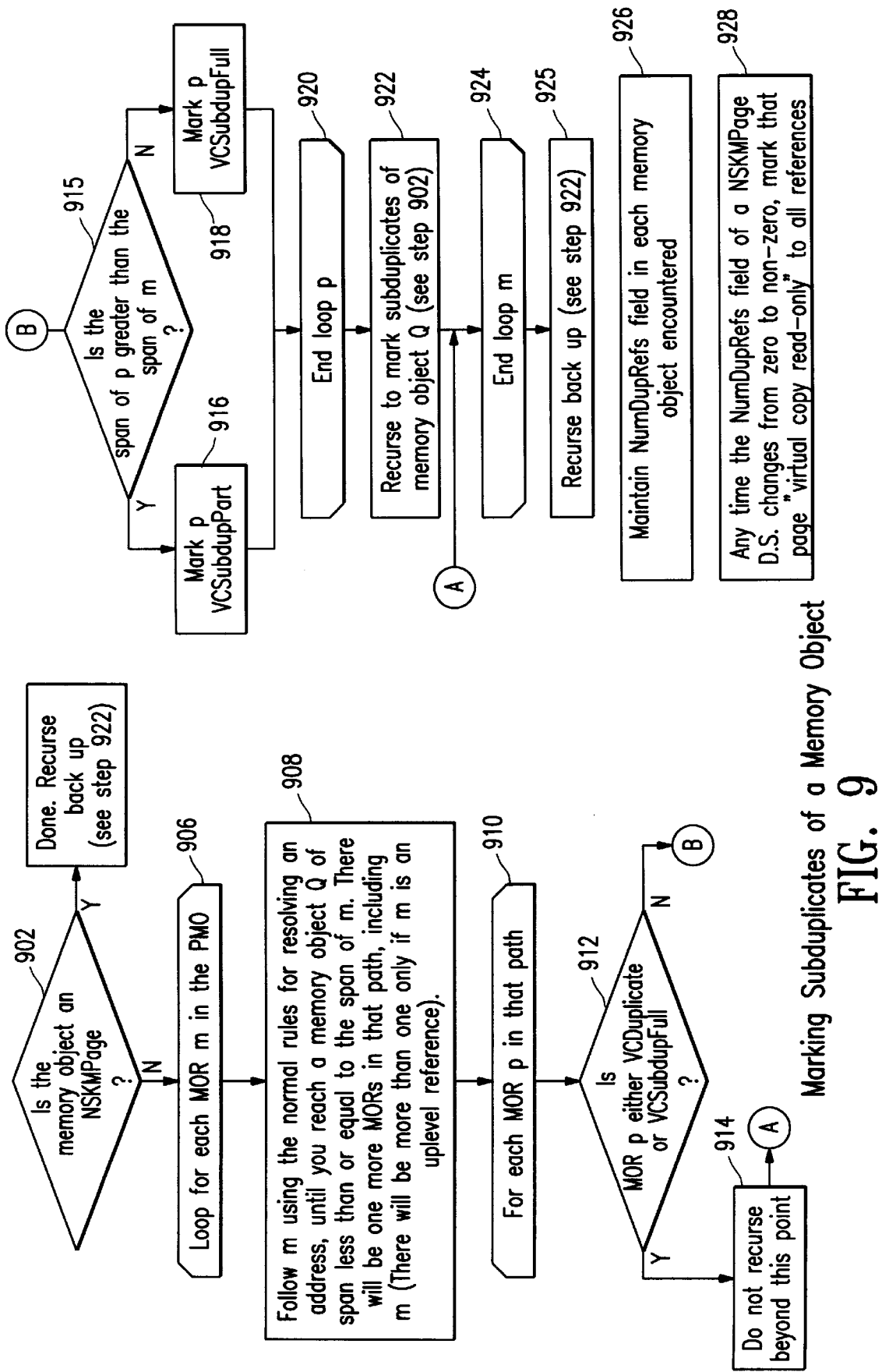
FIG. 9 is flow chart showing steps performed to mark subduplicates.

FIG. 8 is a flow chart showing steps performed to copy a page using the copy on write operation. FIG. 9 is a flow chart showing details of the steps of FIG. 8. The steps of FIG. 8 can be viewed in conjunction with the examples of FIGS. 10 and 11, which illustrate first and second examples of a copy on write operation.

Figure 10:
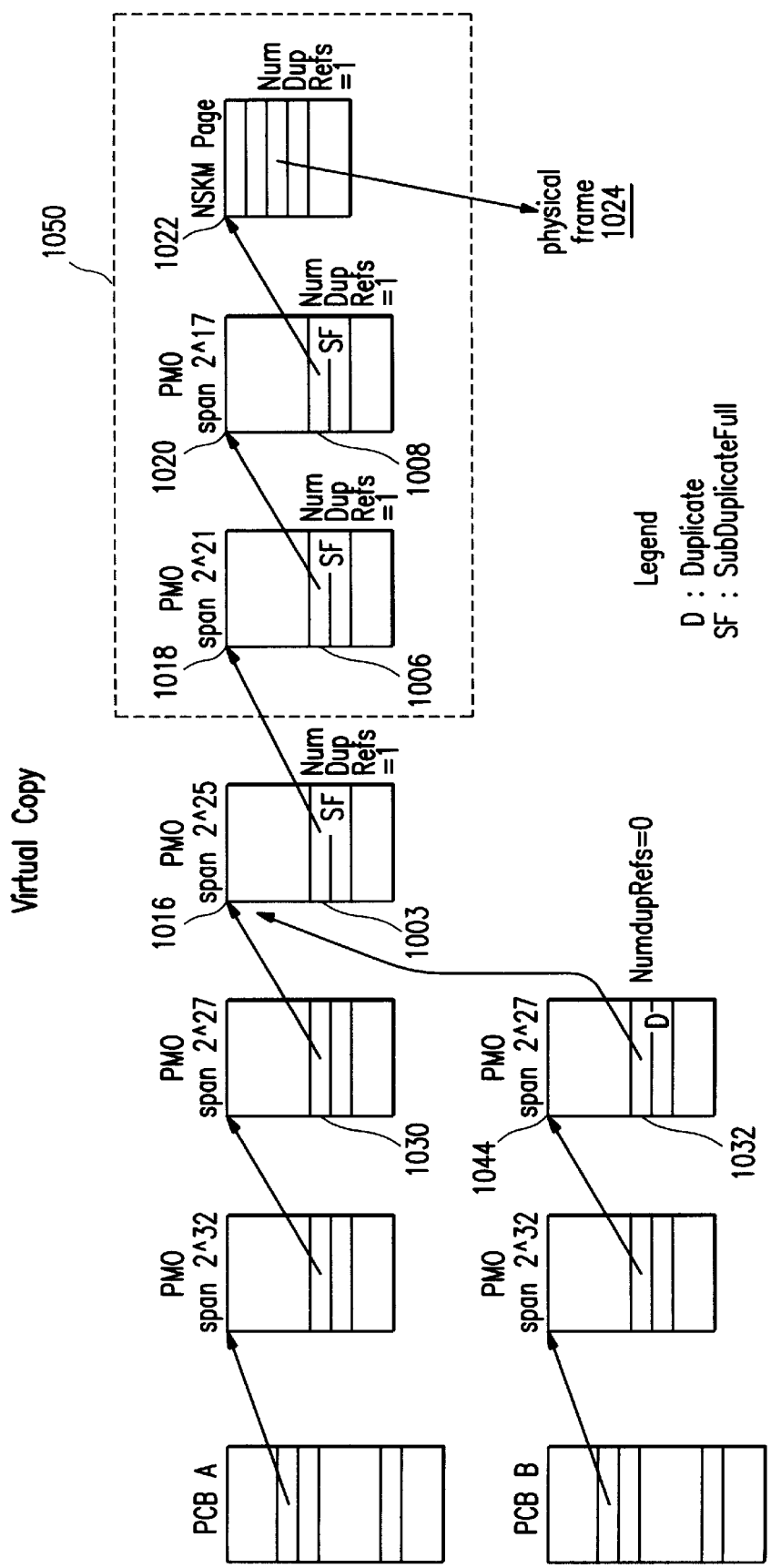
FIG. 10 is a diagram illustrating an example of copying a page.

The following paragraphs discuss the steps of FIGS. 8 and 9 in connection with the example of FIG. 10. In FIG. 10, "D" stands for "Duplicate" and "SF" stands for "Subduplicate-Full" (also called SubdupFull). In the example of FIG. 10, the copy on write operation copies the memory referenced by MOR 1030. Step 802 of FIG. 8 follows the original MOR 1030 until it reaches a memory object/PMO of span no greater than the new MOR 1032. In the example of FIG. 10, the PMO with a span no greater than MOR 1032 is PMO 1016, which has a span of $2^{25}$. Step 804 creates the new MOR 1032 to refer to PMO 1016. MOR 1032 has a VCState of VCDuplicate, as indicated by the letter "D" in MOR 1032 in the Figure.

Step 806 recurses through all possible addresses relative to the memory object 1016, setting an appropriate value in the VCState field in the MORs encountered. Additional details of step 806 are shown in FIG. 9.

The steps of FIG. 9 have the effect of marking MORs 1003, 1006, and 1008 of FIG. 10 (as well as other MORs not shown) as subduplicates. Although the steps of FIG. 9 describe a recursive method, the use of recursion is provided by way of example and is not to be taken as a limitation.

The method of FIG. 9 initially acts on memory object PMO 1016, which is pointed to by the duplicate MOR 1032. Step 902 determines whether the memory object is an NSKMPage data structure. If so, the method is done with this path and control recurses back up (see the recursive call in step 922). If the memory object is not a NSKMPage data structure, but is a PMO, control passes to step 906. In step 906, the method loops for each MOR m in the PMO as follows.

Step 908 follows MOR m using the normal rules for resolving an address, until it reaches a memory object Q of span less than or equal to the span of m. There will be one or more MORs in that path, including m (There will be more than one only if m is an uplevel reference). Step 910 begins a loop for each MOR p in that path. In the example of FIG. 10, the loop 910 is for MOR 1003.

Step 912 determines whether the VCState of MOR p is already marked as VCDuplicate or VCSubdupFull. If this is the case, the method does not follow the path any further and control passes to step 924. This step of checking the VCState and not following the path for VCDuplicate or VCSubdupFull MORs saves execution time during subsequent copy on write operations. There is no point in following the path further, since all relevant MORs in a VCDuplicate or VCSubdupFull path will already be marked as duplicates or subduplicates. If, on the other hand, the MOR is not marked or is marked as VCSubdupPart, control passes to step 915. In FIG. 10, control passes to step 915 because MOR 1003 is initially not marked.

In step 915, if the span of MOR p is greater than the span of MOR m, the MOR p is marked VCSubdupPart in step 916. If the span of MOR p is not greater than the span of MOR m, the MOR p is marked VCSubdupFull in step 918. Here, the span of MOR p (MOR 1003) is not greater than the span of MOR m (also MOR 1003), so MOR 1003 is marked VCSubdupFull in step 918. Step 920 ends the loop for MOR p. Step 922 places a recursive call to the method in order to mark subduplicates of memory object Q (PMO 1018). It will be understood that the method can be implemented using any appropriate programming techniques and that the described recursive implementation is provided for the sake of example only. Non-recursive implementations are also appropriate.

Step 924 ends the loop for MOR m. Step 926 indicates that the field NumDupRefs is maintained for each memory object encountered in the steps of FIG. 9. Step 928 indicates that any time the NumDupRefs field of an NSKMPage data structure changes from zero to non-zero, a page corresponding to that NSKMPage data structure is designated as read only (also called "ROVC" read only virtual copy) in all mapping tables in which it appears to indicate that the page has been copied. This I/O status indicates that the page temporarily cannot be written until after an actual copy is performed During traversal of the MORs in the subtree, the field NumDupRefs in each memory object is updated. The variable NumDupRefs indicates the number of MORs that reference the current memory object and do not have a VCState of VCOriginal.

Figure 11:
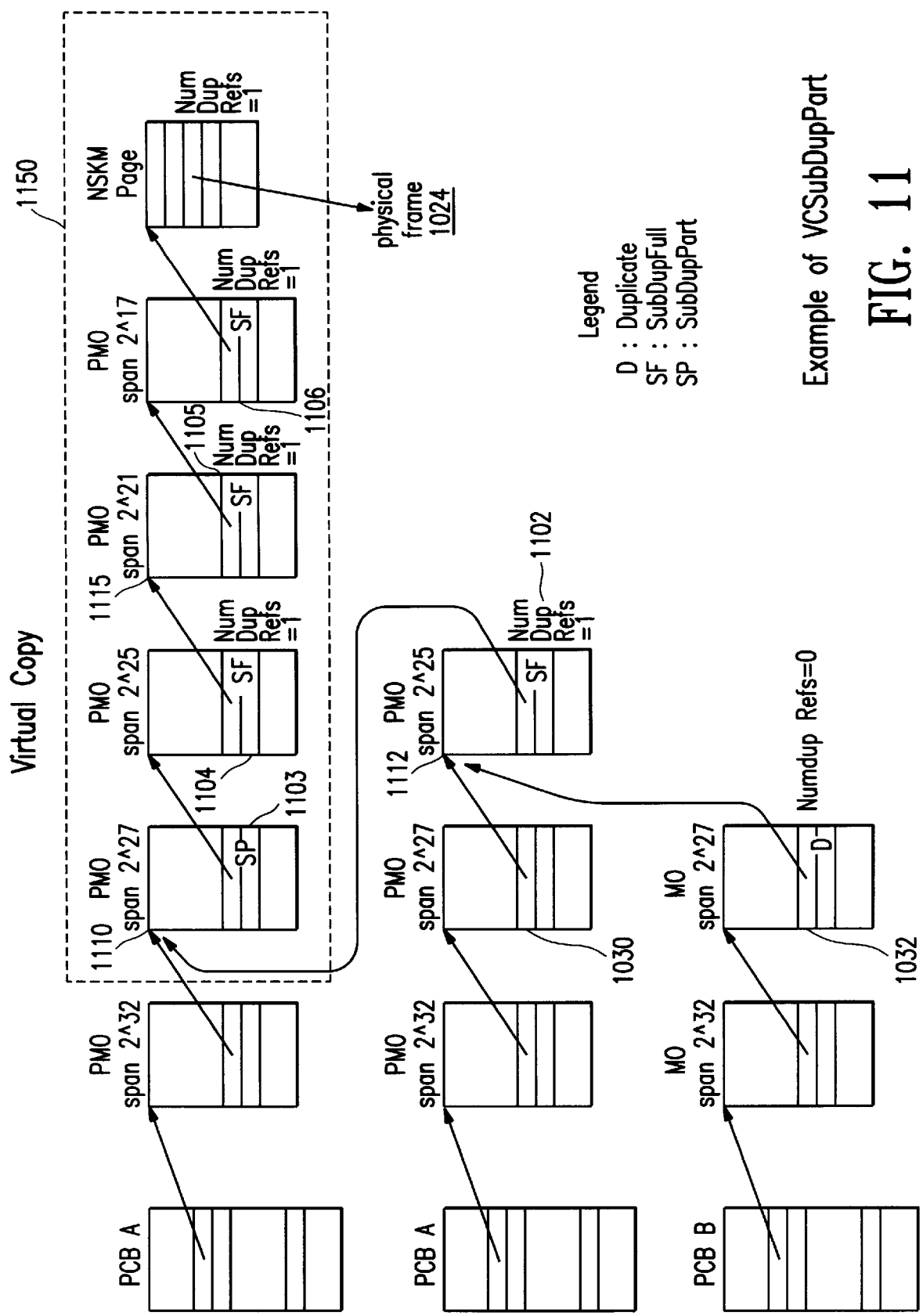
FIG. 11 is a diagram illustrating a second example of copying a page.

Note that, if and when a second copy on write is performed to the same area of memory of the first copy on write, the method will skip traversing subtree 1050 of FIG. 10 and subtree 1150 of FIG. 11. The fact that these subtrees are skipped results in a more efficient copy on write operation. If an even further copy were to be made for PMO 1110 in FIG. 11, the method would subsequently skip PMOs 1115 and below.

FIG. 11 is a diagram illustrating a second example of copying a page when the memory being copied involves an uplevel reference. In FIG. 11, "D" stands for "Duplicate," "SF" stands for "SubduplicateFull" (also called SubdupFull), and "SP" stands for "SubduplicatePart." (also called SubdupPart). The memory referenced by PMO 1112 is being copied. Specifically, duplicate MOR 1032 points to PMO 1112, which is used as the initial memory object for the steps of FIG. 9. In connection with FIG. 11, step 902 determines that PMO 1112 is a PMO and control passes to step 906. In step 906, the method loops for each MOR m in the PMO 1112.

When m is the MOR 1102, step 908 follows MOR m using the normal rules for resolving an address, until it reaches a memory object Q of span less than or equal to the span of m. In the example, memory object Q is PMO 1115 and there are three MORs in the path (MORs 1102 and 1103 and 1104). Step 910 begins a loop for each MOR p in that path.

Step 912 determines whether the VCState of MOR p is already marked as VCDuplicate or VCSubdupFull. When MOR p is MOR 1102, it is not yet marked as a subduplicate and control passes to step 915. In step 915, since the span of MOR p (MOR 1102) ($2^{21}$) is not greater than the span of MOR m (also MOR 1102) ($2^{21}$), the MOR p (MOR 1102) is marked VCSubdupFull in step 918. When MOR p is MOR 1103, it is not yet marked as a duplicate and control passes to step 915. In step 915, since the span ($2^{25}$) of MOR p (MOR 1103) is greater than the span ($2^{21}$) of MOR m (MOR 1102), the 1103 is marked VCSubdupPart in step 916. Marking the MOR 1103 as VCSubdupPart means that, during a later copy on write operation, not all MORS reachable from MOR 1103 have been marked as subduplicates and the MORS reachable from MOR 1103 will have to be inspected to determine if they need to be marked as a subduplicate. When MOR p is MOR 1104, it is not yet marked as a duplicate and control passes to step 915. In step 915, since the span ($2^{21}$) of MOR p (MOR 1104) is not greater than the span ($2^{21}$) of MOR m (MOR 1102), the MOR p is marked VCSubdupFull in step 918. It should be understood that more than one MOR in a path can be marked as VCSubdupPart if, e.g., the uplevel reference skips several levels.

Step 920 ends the loop for MOR p. Step 922 places a recursive call to the method in order to mark subduplicates of memory object Q (PMO 1115). During this recursive call, the MORs 1105 and 1106 are marked as VCSubdupFull. If the memory referenced by PMO 1110 is later copied, the method would subsequently skip MORs 1104 and below.

Step 924 ends the loop for MOR m. In the example, the content of only one MOR in PMO 1112 is shown for the sake of clarity. The steps of the m loop are performed for each MOR in each PMO reachable from PMO 1112 including those not shown.

Figure 12:
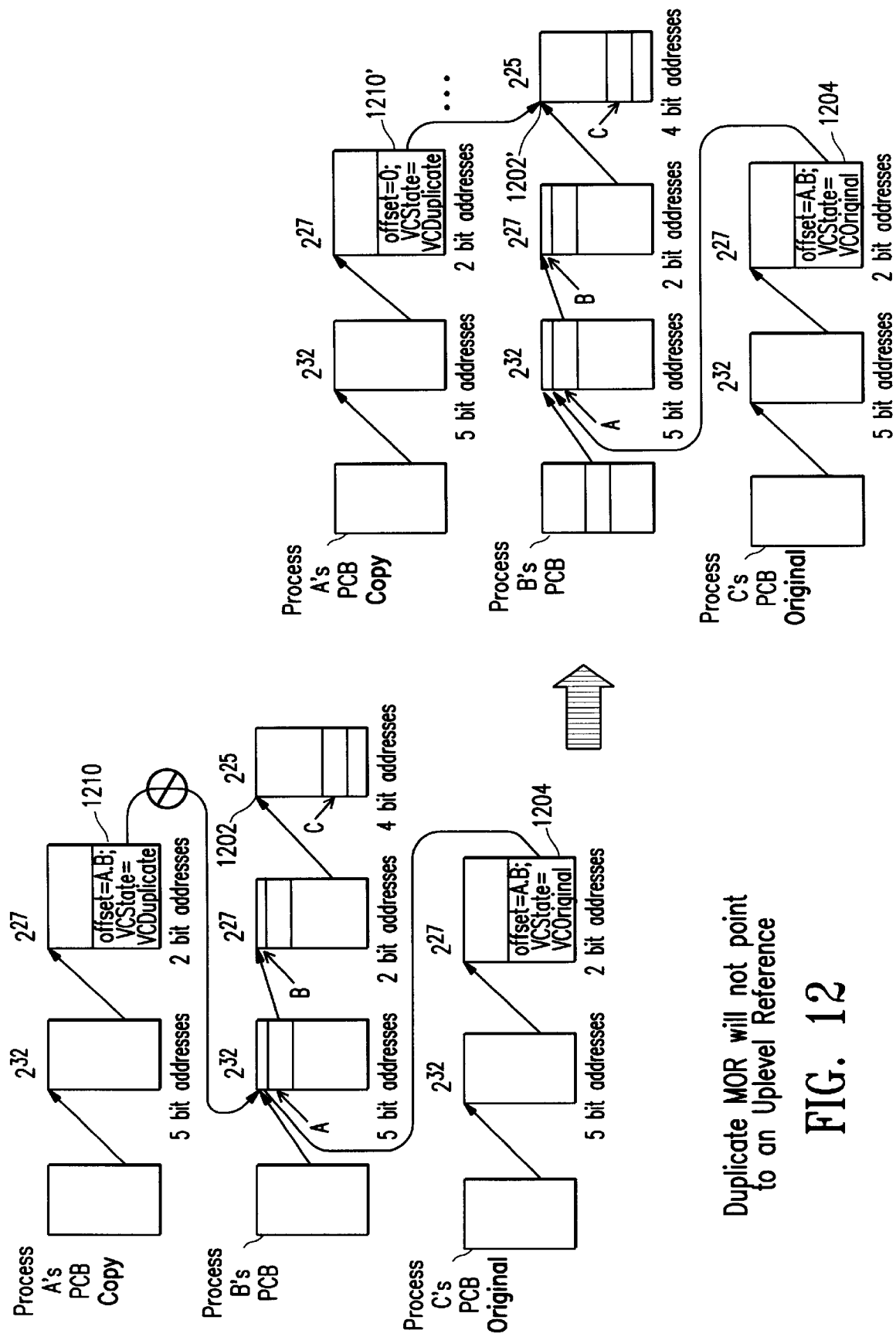
FIG. 12 is a diagram illustrating that a duplicate MOR cannot point to an uplevel reference.

FIG. 12 illustrates the rule that a duplicate MOR cannot point to an uplevel reference. FIG. 12 shows an original MOR 1204 that contains an uplevel reference. As shown in FIG. 12, a duplicate MOR 1210 (i.e., a MOR having a VCState of VCDuplicate) will not point to an uplevel reference. Instead, the method of FIGS. 8 and 9 gives duplicate MOR 1210 an offset of "0" and alters duplicate MOR 1210' to point directly to PMO 1202'. Note that this rule does not apply to a subduplicate MOR, such as the MOR 1102 in PMO 1112 of FIG. 11.

IV. Write Operation to the New Copy after Copy on Write

Figure 13:
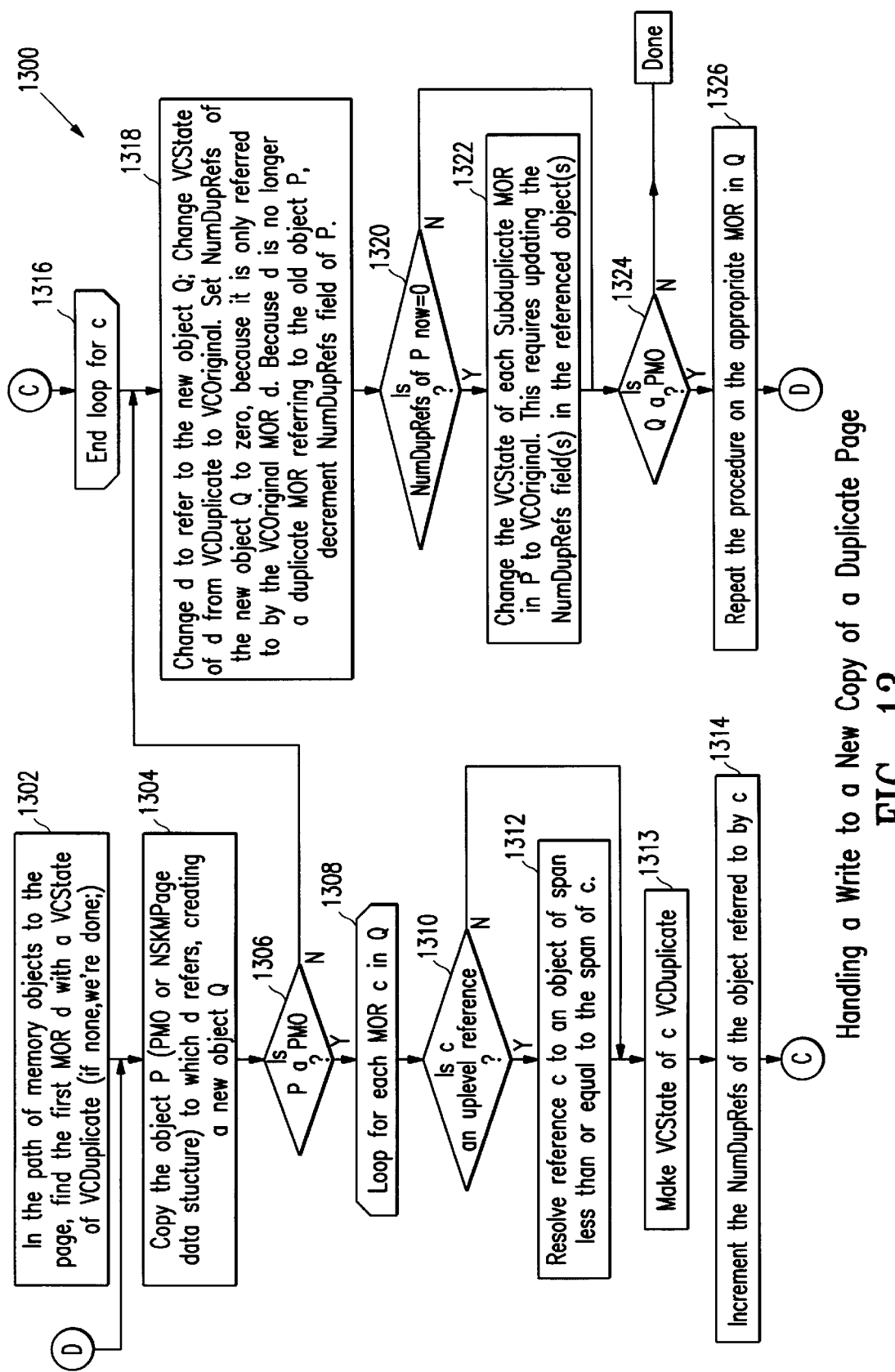
FIG. 13 is a flow chart showing steps to write to a copy of a duplicate page.
Figure 14:
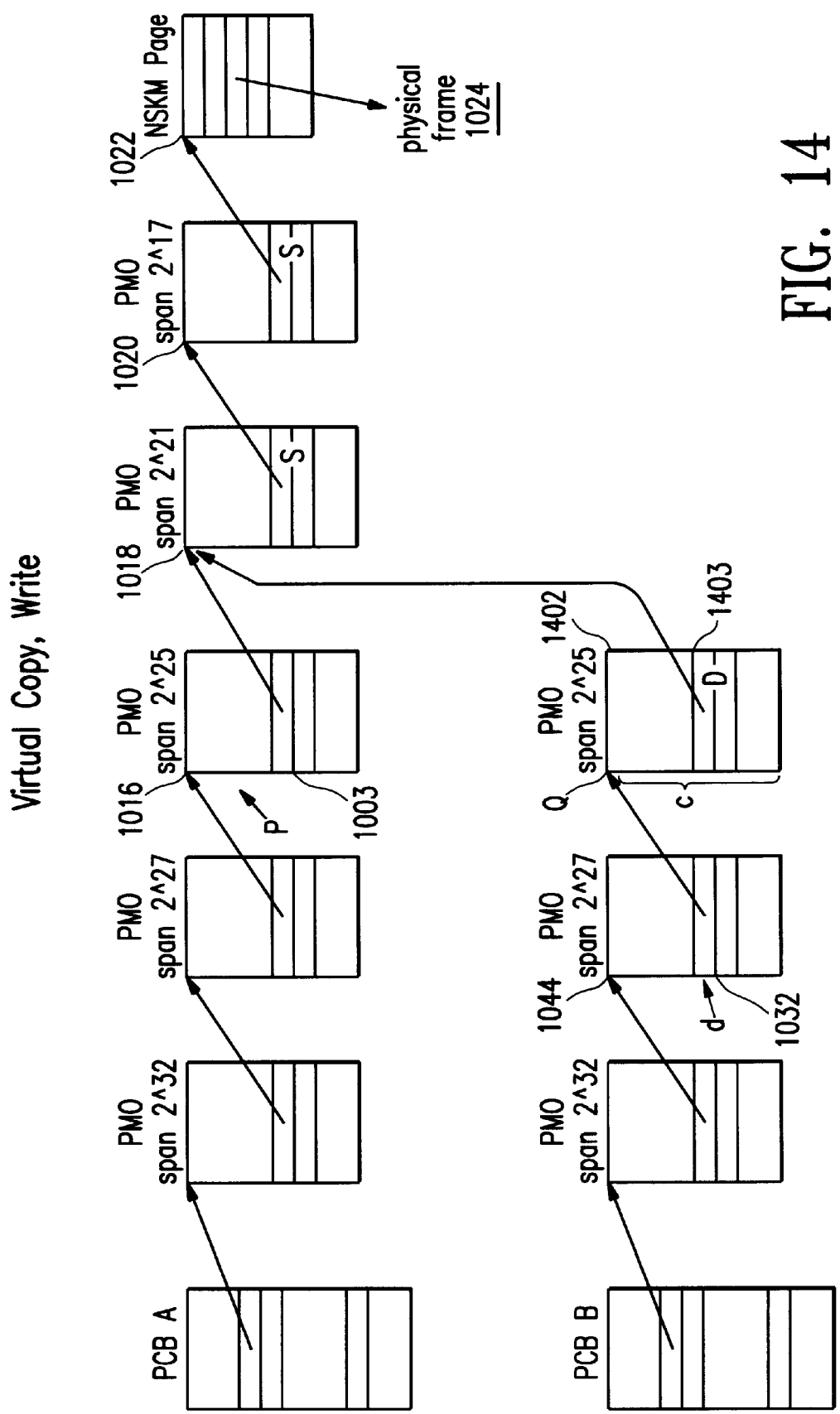
FIGS. 14–16 are diagrams illustrating an example of writing to a copy of a duplicate page.
Figure 15:
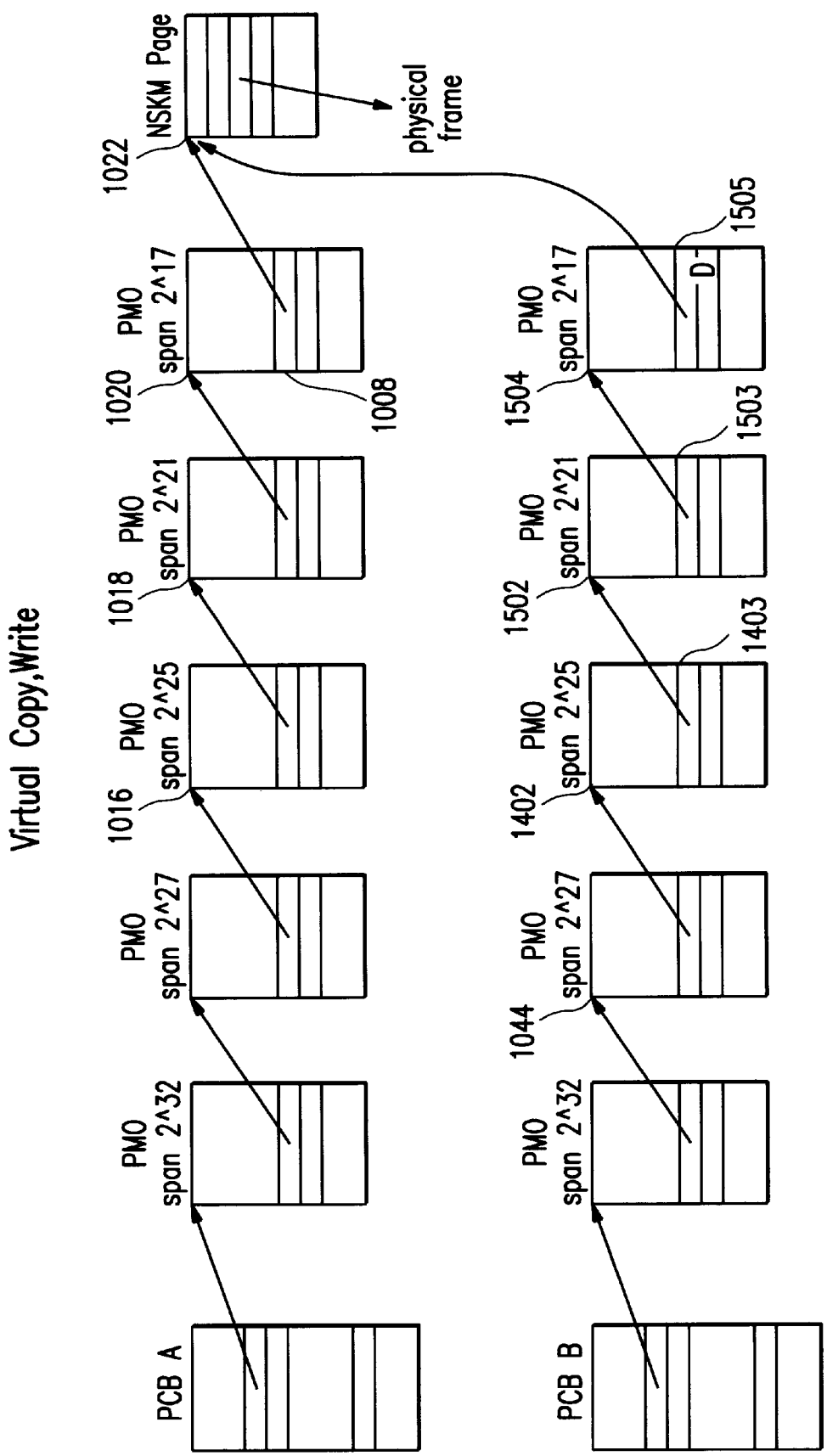
Figure 16:
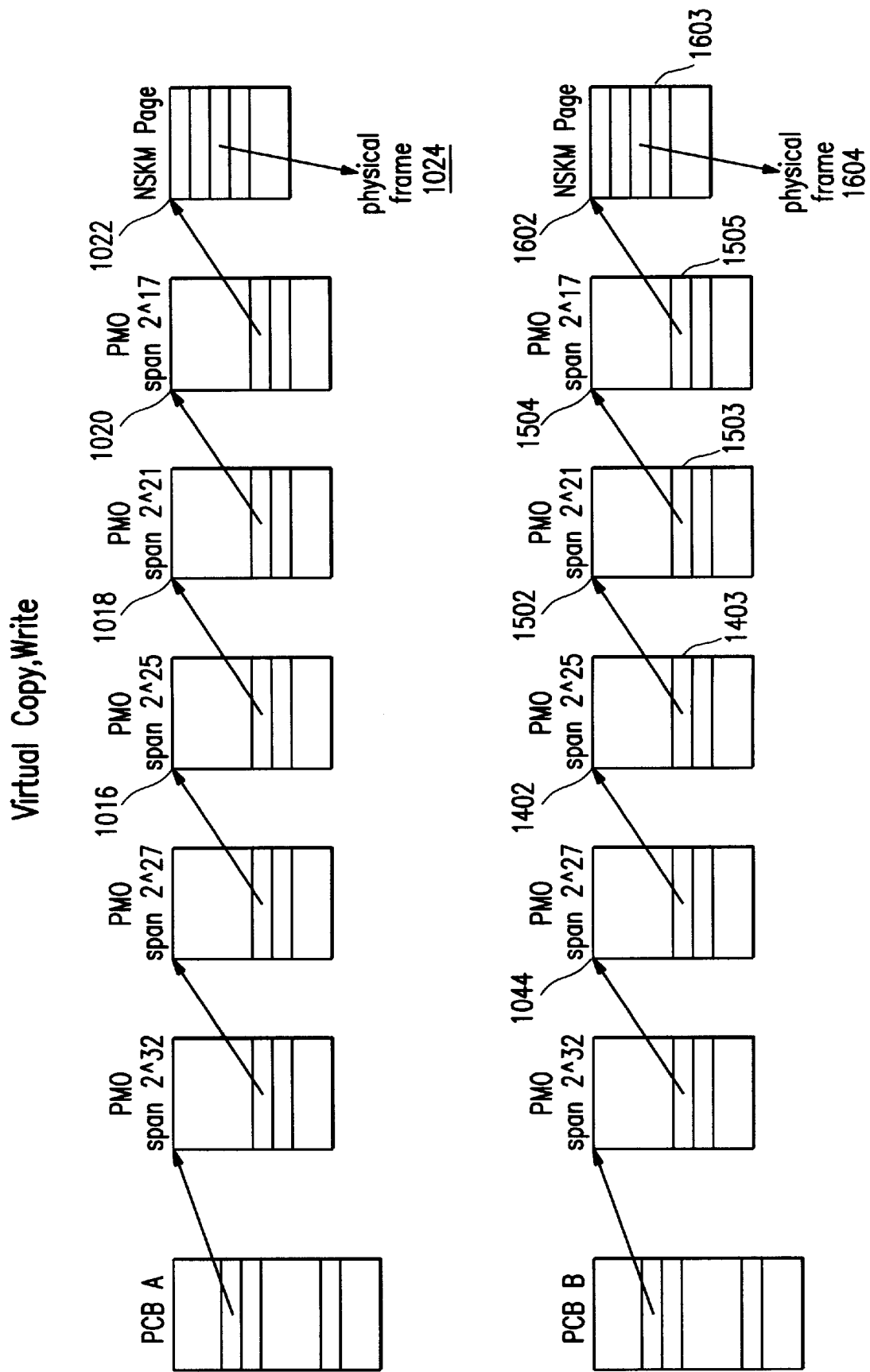

FIG. 13 is a flow chart showing steps performed during a write to a new copy of a duplicated page. The steps of FIG. 13 are discussed in conjunction with the example of FIGS. 14–16. FIG. 14 illustrates an example of a first step in writing to a new copy of a page that has been duplicated via copy on write as shown in FIG. 10. Each of FIGS. 14–16 shows memory contents after respective iterations of the steps of FIG. 13. (One iteration between FIGS. 14 and 15 is not shown).

FIG. 14 shows that, after the steps of FIG. 13 after one iteration, PMO 1402 is copied from PMO 1016. In FIG. 14, "S" stands for "SubDuplicate." MOR 1032 in PMO 1044 is unmarked as a duplicate and all MORs in PMO 1402 are marked as duplicates. The NumDupRefs field of PMO 1016 is decremented from 1 to 0. All MORs in PMO 1016 are changed from VCSubdupFull to VCOriginal and the NumDupRefs fields in the referenced memory objects are decremented. NumDupRefs in PMO 1018 is unchanged; it was incremented because of the VCDuplicate MOR 1403 and decremented because the MOR 1003 in PMO 1016 was changed from VCDuplicate to VCOriginal.

In detail, the steps of FIG. 13 are performed as follows in connection with FIGS. 10 and 14. In step 1302, in the path of memory objects from PCB B to the page 1024, the first MOR d with a VCState of VCDuplicate is MOR 1032. Step 1304 copies the object P (PMO 1016) to which d refers, creating a new memory object 1402. Since P (PMO 1016) is a PMO in step 1306, control passes to step 1308.

Step 1308 is a loop for each MOR c in Q (PMO 1402). If MOR c is an uplevel reference (step 1310, not the case here), step 1312 resolves the uplevel reference as shown in FIG. 12. Step 1313 sets the VCState of MOR c to VCDuplicate. Here, for example, the VCState of MOR 1403 is set to VCDuplicate in step 1313. Step 1314 increments the NumDupRefs field of PMO 1018 (and all other objects referred to by MORS of PMO 1402).

Step 1316 ends the loop for MORs c. The result of setting MORs of PMO 1402 (other than MOR 1403) to VCDuplicate is not shown in the Figure. Step 1318 changes MOR d (MOR 1032) to refer to the new object Q (PMO 1402). Step 1318 further changes VCState of MOR d (MOR 1032) to VCOriginal and sets NumDupRefs of the new object Q (PMO 1402) to zero, since Q is only referred to by newly original MOR d. Step 1318 also decrements NumDupRefs of P (PMO 1016).

If, in step 1320, the NumDupRefs of P (PMO 1016) is now equal to "0", step 1322 changes the VCState of each subduplicate MOR in P to VCOriginal. This step require updating the NumDupRefs field(s) in the referenced object (s). If any goes to zero (this can happen if a MOR in P is an uplevel reference), its subduplicate MORS are changed to VCOriginal and the NumDupRefs field is updated recursively. This step is not applicable to FIG. 14. If Q is a PMO (step 1324, for example, PMO 1402 is a PMO), then control passes to step 1326, which repeats the steps of FIG. 13 for MOR 1403 in Q (PMO 1402). Note that MORs in PMO 1402 other than MOR 1403 refer to objects that will not be copied.

FIG. 15 shows that, after FIG. 14, PMO 1504 is copied from PMO 1020. MOR 1503 in PMO 1502 is unmarked as a duplicate and all MORs in PMO 1504 are marked as duplicates. The NumDupRefs field of PMO 1020 is decremented from 1 to 0. All MORs in PMO 1020 are changed from VCSubdupFull to VCOriginal and the NumDupRefs fields in the referenced memory objects are decremented. NumDupRefs in NSKMPage data structure 1022 is unchanged; it was incremented because of the VCDuplicate MOR in 1505 and decremented because of the MOR 1008 in PMO 1020.

FIG. 16 shows that NSKMPage data structure 1602 and a physical page frame 1604 are copied from NSKMPage data structure 1022 and an existing physical page 1024. MOR 1505 in PMO 1504 is unmarked as a duplicate. The NumDupRefs field of NSKMPage 1022 is decremented from 1 to 0. Page 1022 need no longer be temporarily considered as ROVC in all mapping tables that reference the page. Thus, actually copying the tables is postponed until the user requests that it be performed, and only the necessary tables are copied.

V. Write Operation to the Original of a Duplicated Object after Copy on Write

Figure 17:
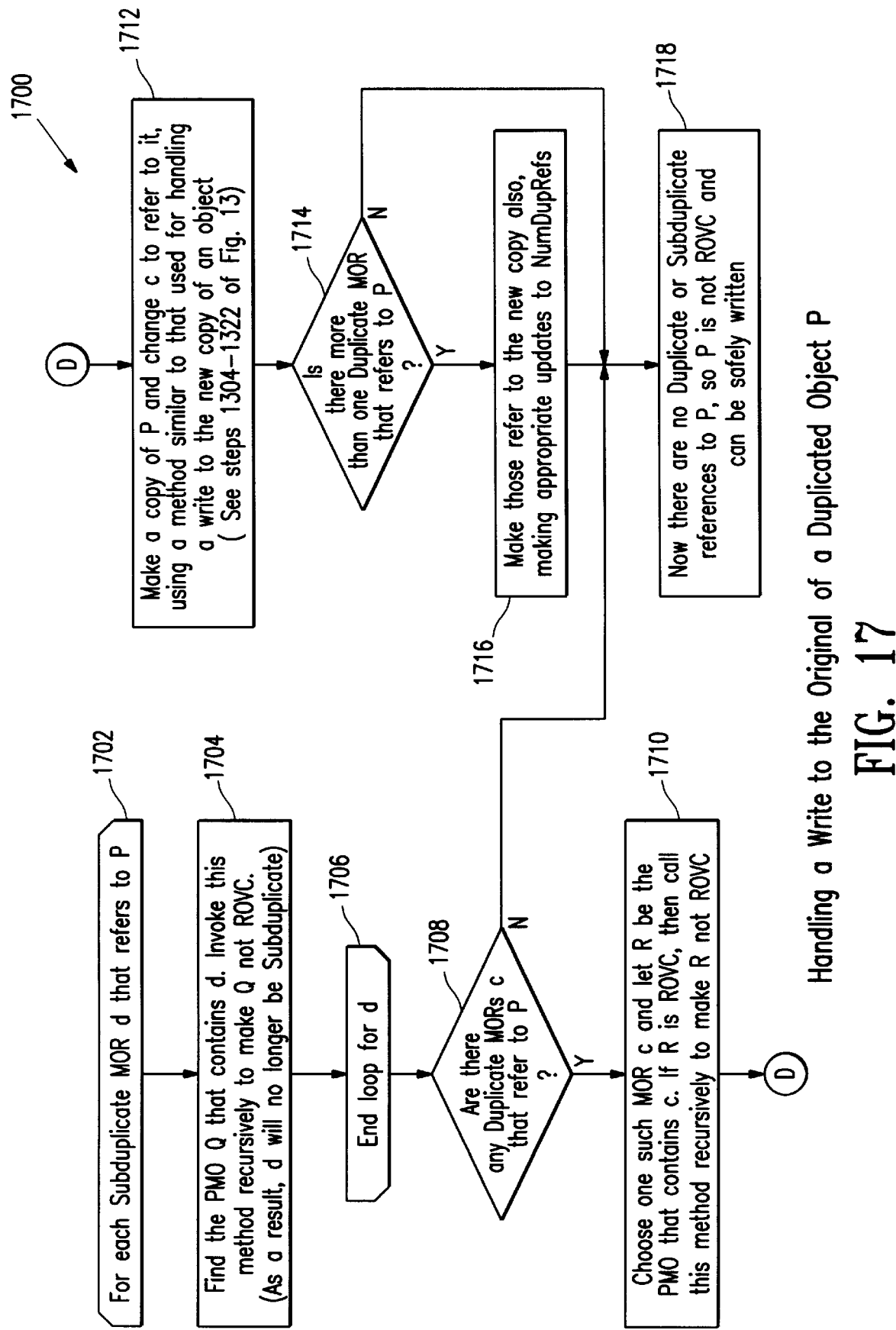
FIG. 17 is a flow chart showing steps to write to an original of a duplicate memory object.

FIG. 17 is a flow chart showing steps to write to an original of a duplicated memory object after a copy on write operation. By definition, such a memory object is temporarily read-only (ROVC or read only virtual copy) because it is pointed to by at least one duplicate and/or subduplicate MOR that refers to it. The steps of FIG. 17 make the memory object "not ROVC" by copying all duplicate and subduplicate MORs that point to it (either directly or indirectly).

For example, the steps of FIG. 17 are performed to write to physical page 1024 of FIG. 10. Step 1702 is a loop for each subduplicate MOR d that refers to P. In the example of FIG. 10, P is initially NSKMPage data structure 1022 and the loop of step 1702 would be for MOR 1008. As an example, assume that step 1704 found PMO Q (PMO 1020) that contains MOR d (MOR 1008). Step 1704 makes a recursive call to the method of FIG. 17. After control returns from the recursive call of step 1704, MOR 1008 will no longer be a subduplicate. The result is shown in FIG. 15. Step 1706 ends the loop for MOR d. Thus, steps 1702 through 1706 deal with subduplicate MORs.

Steps 1710 through 1716 deal with duplicate MORs. If, in step 1708, there are duplicate MORs that refer to P, control passes to step 1710. Step 1710 chooses one duplicate MOR c 1505 that refers to P and lets R be the PMO 1504 that contains c. Step 1712 makes a copy of P and changes c to refer to it, using a method similar to that used for handling a write to the new copy of an object (see steps 1304–1322 of FIG. 13).

If, in step 1714, there is more than one duplicate MOR that refers to P, control passes to step 1716. In step 1716, set the duplicate MORs that refer to P to refer to the new copy also, making appropriate updates to NumDupRefs. By the time control reaches step 1718, there are no duplicate or subduplicate references to P remaining, so P is not ROVC and can be safely written.

In summary, the present invention improves the efficiency of the copy on write operation by introducing the concept of subduplicates. These subduplicates are further divided into VCSubdupFull and VCSubdupPart. When a second copy on write operation is performed, it is unnecessary to traverse subtrees marked as VCSubdupFull or VCDuplicate, since these have already been marked. In contrast, it is still necessary to traverse subtrees marked as VCSubdupPart, since these subtrees are referenced by uplevel references and not all of the memory space that can be referenced by the memory object are marked as duplicates.

While the invention has been described in conjunction with a specific embodiment, it is evident that many alternatives, modifications and variations will be apparent to those skilled in the art in light of the foregoing description. Accordingly, it is intended to embrace all such alternatives, modifications and variations as fall within the spirit and scope of the appended claims and equivalents.

What is claimed is:

1. A method of implementing a copy on write operation in a virtual memory, performed by a data processing system, comprising:
receiving an instruction to implement a copy on write for a portion of memory, where the location of the portion of memory is described by a chain of memory objects having an initial memory object and at least one subsequent memory object that includes at least one Memory Object reference (MOR);
creating a copy of a MOR in the initial memory object;
creating a pointer in the copy of the MOR to the memory being copied;
marking the copy of the MOR as duplicated, while deferring actually copying the portion of memory; and
marking at least one of the MORs in the at least one subsequent memory object as a subduplicate.

2. The method of claim 1, wherein the initial memory object is a partitioned memory object and wherein marking the MOR in the copy of the initial memory object as duplicated includes setting a VCState field in the copied MOR to a value of VCDuplicate.

3. The method of claim 1, wherein at least one of the subsequent memory objects is a partitioned memory object (PMO) and wherein marking the MORs in the subsequent memory objects as subduplicates includes setting a VCState field in each MOR to a value of VCSubdupPart when the memory defined by the MOR is not within a memory window.

4. The method of claim 1, wherein at least one of the subsequent memory objects is a partitioned memory object (PMO) and wherein marking the MORs in the subsequent memory objects as subduplicates includes setting a VCState field in the MOR to a value of VCSubdupFull when the memory defined by the MOR is within a memory window.

5. The method of claim 1, further comprising:

receiving a second instruction to implement a copy on write for a second portion of memory that overlaps the first portion of memory, where the location of the second portion of memory is described by a chain of memory objects having a second initial memory object and at least one second subsequent memory object that includes at least one Memory Object reference (MOR);

creating a copy of a MOR in the second initial memory object;

marking the copy of the MOR in the second initial memory object as duplicated, while deferring actually copying the second portion of memory;

creating a pointer in the copy of the MOR, in the second initial memory object, to the memory being copied;

marking the at least one MOR in at least one of the second subsequent memory objects as a subduplicate if it is not so-marked; and skipping marking a MOR in another of the second subsequent memory objects as a subduplicate if the MOR is already marked as VCDuplicate or VCSubdupFull.

6. The method of claim 1, further including:

receiving an instruction to write to the portion of memory; and duplicating the portion of memory and the subsequent memory objects in response to the write instruction.

7. The method of claim 1, further comprising interpreting an I/O status of the portion of memory as Read Only Virtual Copy (ROVC) when a number of MORs that refer to a PMO and have a VCState other than VCOriginal is equal to zero.

8. The method of claim 1, further comprising incrementing a count in each subsequent memory object if the MOR pointing to the subsequent memory object is changed from VCOriginal to VCDuplicate, VCSubdupFull, or VCSubdupPart.

9. The method of claim 6, further comprising decrementing a count in each subsequent memory object as the subsequent memory object is duplicated.

10. An apparatus that implements a copy on write operation in a virtual memory, comprising:

a software portion configured to receive an instruction to implement a copy on write operation for a portion of memory, where the location of the portion of memory is described by a chain of memory objects having an initial memory object and at least one subsequent memory object that includes at least one Memory Object Reference (MOR);

a software portion configured to create a copy of a MOR in the initial memory object;

a software portion configured to create a pointer in the copy of the MOR to the memory being copied;

a software portion configured to mark the copy of the MOR as duplicated, while deferring actually copying the portion of memory; and a software portion configured to mark the at least one MOR in the at least one subsequent memory object as a subduplicate.

11. The apparatus of claim 10, wherein the initial memory object is a partitioned memory object and wherein the software portion configured to mark the MOR in the copy of the initial memory object as duplicated includes a software portion configured to set a VCState field in the copied MOR to a value of VCDuplicate.

12. The apparatus of claim 10, wherein at least one of the subsequent memory objects is a partitioned memory object (PMO) and wherein the software portion configured to mark the MORs in the subsequent memory objects as subduplicates includes a software portion configured to set a VCState field in each MOR to a value of VCSubdupPart when the memory defined by the MOR is not within a memory window.

13. The apparatus of claim 10, wherein at least one of the subsequent memory objects is a partitioned memory object (PMO) and wherein the step of marking the MORs in the subsequent memory objects as subduplicates includes a software portion configured to set a VCState field in the MOR to a value of VCSubdupFull when the memory defined by the MOR is within a memory window.

14. The apparatus of claim 10, further comprising:

a software portion configured to receive a second instruction to implement a copy on write for a second portion of memory that overlaps the first portion of memory, where the location of the second portion of memory is described by a chain of memory objects having a second initial memory object and at least one second subsequent memory object that includes at least one Memory Object reference (MOR);

a software portion configured to create a copy of a MOR in the second initial memory object;

a software portion configured to mark the copy of the MOR in the second initial memory object as duplicated, while deferring actually copying the second portion of memory;

a software portion configured to create a pointer in the copy of the MOR, in the second initial memory object, to the memory being copied;

a software portion configured to mark the at least one MOR in at least one of the second subsequent memory objects as a subduplicate if it is not so-marked; and a software portion configured to skip marking a MOR in another of the second subsequent memory objects as a subduplicate if the MOR is already marked as VCDuplicate or VCSubbdupFull.

15. The apparatus of claim 10, further including:

a software portion configured to receive an instruction to write to the portion of memory; and a software portion configured to duplicate the portion of memory and the subsequent memory objects in response to the write instruction.

16. The apparatus of claim 10, further comprising a software portion configured to interpret an I/O status of the portion of memory as Read Only Virtual Copy (ROVC) when a number of MORs that refer to a PMO and have a VCState other than VCOriginal is equal to zero.

17. The apparatus of claim 10, further comprising a software portion configured to increment a count in each subsequent memory object if the MOR pointing to the subsequent memory object is changed from VCOriginal to VCDuplicate, VCSubdupFull, or VCSubdupPart.

18. The apparatus of claim 15, further comprising a software portion configured to decrement a count in each subsequent memory object as the subsequent memory object is duplicated.

19. A computer program product, comprising:

a computer-readable medium, having computer instructions thereon, including:

computer program code devices configured to cause a data processing system having a virtual memory system to receive an instruction to implement a copy on write operation for a portion of memory, where the location of the portion of memory is described by a chain of memory objects having an initial memory object and at least one subsequent memory object that includes at least one Memory Object Reference (MOR);

computer program code devices configured to cause a data processing system to create a copy of a MOR in the initial memory object;

computer program code devices configured to cause a data processing system to create a pointer in the copy of the MOR to the memory being copied;

computer program code devices configured to cause a data processing system to mark the copy of the MOR as duplicated, while deferring actually copying the portion of memory; and computer program code devices configured to cause a data processing system to mark the at least one MOR in the at least one subsequent memory object as a subduplicate.

* * * * *